US011449908B2

(12) United States Patent
Song et al.

(10) Patent No.: US 11,449,908 B2
(45) Date of Patent: Sep. 20, 2022

(54) METHOD AND SYSTEM FOR DETERMINING TRANSPORT SERVICE FEE

(71) Applicant: BEIJING DIDI INFINITY TECHNOLOGY AND DEVELOPMENT CO., LTD., Beijing (CN)

(72) Inventors: Qi Song, Beijing (CN); Beibei Zhang, Beijing (CN); Zhangxun Liu, Beijing (CN); Ziyuan Yan, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 1311 days.

(21) Appl. No.: 15/835,654

(22) Filed: Dec. 8, 2017

(65) Prior Publication Data

US 2018/0101877 A1 Apr. 12, 2018

Related U.S. Application Data

(63) Continuation of application No. PCT/CN2016/092300, filed on Jul. 29, 2016.

(30) Foreign Application Priority Data

Jul. 29, 2015 (CN) .......................... 201510456622.X
Aug. 20, 2015 (CN) .......................... 201510516205.X
(Continued)

(51) Int. Cl.
*G06Q 30/02* (2012.01)
*G06Q 50/30* (2012.01)
(Continued)

(52) U.S. Cl.
CPC ....... *G06Q 30/0283* (2013.01); *G01C 21/343* (2013.01); *G01C 21/3461* (2013.01);
(Continued)

(58) Field of Classification Search
CPC ......... G06Q 30/02; G06Q 50/30; G01C 21/34
See application file for complete search history.

(56) References Cited

U.S. PATENT DOCUMENTS 6,253,146 B1 * 6/2001 Hanson .............. G01C 21/3415
340/905
2006/0106671 A1 5/2006 Biet
(Continued)

FOREIGN PATENT DOCUMENTS

CN 1741473 A 3/2006
CN 101140664 A 3/2008
(Continued)

OTHER PUBLICATIONS

Castillo, Marco, et al. "Gender differences in bargaining outcomes: A field experiment on discrimination." Journal of Public Economics 99 (2013): 35-48. (Year: 2013).*

(Continued)

*Primary Examiner* — George Chen
(74) *Attorney, Agent, or Firm* — Metis IP LLC

(57) ABSTRACT

The present disclosure relates to a method and system for determining a transport service fee. The method may include: obtaining a service request transmitted from a passenger terminal, wherein the service request includes starting point information and destination information; determining an estimated transport service fee based on the service request; obtaining a price adjustment condition based on the service request, wherein the price adjustment condition is related to the starting point or historical information of the passenger terminal or a driver terminal;

(Continued)

determining an amount of the price adjustment based on the price adjustment condition; determining an estimated transport service fee after the price adjustment based on the amount of the price adjustment and the estimated transport service fee; and sending the estimated transport service fee after the price adjustment to the passenger terminal.

20 Claims, 21 Drawing Sheets

(30) Foreign Application Priority Data

| | | |
|---|---|---|
| Aug. 20, 2015 | (CN) | 201510516213.4 |
| Jan. 26, 2016 | (CN) | 201610052732.4 |
| Mar. 14, 2016 | (CN) | 201610144422.5 |

(51) Int. Cl.
  *G01C 21/34* (2006.01)
  *H04W 88/02* (2009.01)

(52) U.S. Cl.
  CPC ..... *G01C 21/3492* (2013.01); *G06Q 30/0206* (2013.01); *G06Q 30/0284* (2013.01); *G06Q 50/30* (2013.01); *H04W 88/02* (2013.01)

(56) References Cited

U.S. PATENT DOCUMENTS

| | | | |
|---|---|---|---|
| 2006/0200430 | A1 | 9/2006 | Kim |
| 2011/0184774 | A1* | 7/2011 | Forstall ................ G06Q 50/30 705/7.25 |
| 2011/0301985 | A1 | 12/2011 | Camp et al. |
| 2013/0246207 | A1 | 9/2013 | Novak et al. |
| 2013/0268406 | A1* | 10/2013 | Radhakrishnan .. G06Q 30/0284 705/26.61 |
| 2014/0006109 | A1* | 1/2014 | Callioni ................ G06Q 30/02 705/7.35 |
| 2014/0074543 | A1* | 3/2014 | Drummond ...... G06Q 10/06315 705/7.25 |
| 2014/0074757 | A1* | 3/2014 | De Gennaro .......... G07B 13/04 705/417 |
| 2014/0180955 | A1* | 6/2014 | Podgurny ............. G06Q 10/06 705/335 |
| 2014/0278838 | A1 | 9/2014 | Novak |
| 2015/0302342 | A1 | 10/2015 | Yeh |

FOREIGN PATENT DOCUMENTS

| | | |
|---|---|---|
| CN | 101210960 A | 7/2008 |
| CN | 101329394 A | 12/2008 |
| CN | 101453420 A | 6/2009 |
| CN | 101556706 A | 10/2009 |
| CN | 101662722 A | 3/2010 |
| CN | 101814201 A | 8/2010 |
| CN | 101990239 A | 3/2011 |
| CN | 201984540 U | 9/2011 |
| CN | 202217324 U | 5/2012 |
| CN | 102521971 A | 6/2012 |
| CN | 102542026 A | 7/2012 |
| CN | 102572611 A | 7/2012 |
| CN | 102663635 A | 9/2012 |
| CN | 102752669 A | 10/2012 |
| CN | 102930606 A | 2/2013 |
| CN | 103150762 A | 6/2013 |
| CN | 103150763 A | 6/2013 |
| CN | 103824181 A | 5/2014 |
| CN | 103841517 A | 6/2014 |
| CN | 103971507 A | 8/2014 |
| CN | 104021667 A | 9/2014 |
| CN | 203966185 U | 11/2014 |
| CN | 104363257 A | 2/2015 |
| CN | 204204044 U | 3/2015 |
| CN | 105117790 A | 12/2015 |
| CN | 105160711 A | 12/2015 |
| CN | 105184726 A | 12/2015 |
| JP | 2002324014 A | 11/2002 |
| JP | 2003346291 A | 12/2003 |
| JP | 2007052729 A | 3/2007 |
| JP | 3143444 U | 7/2008 |
| JP | 2014075727 A | 4/2014 |
| WO | WO-0219202 A1 * | 3/2002 ............. G06Q 30/06 |
| WO | 2016023433 A1 | 2/2016 |

OTHER PUBLICATIONS

Search Report in Singapore Application No. 11201710712T dated Mar. 19, 2019, 2 Pages.
Written Opinion in Singapore Application No. 11201710712T dated Mar. 19, 2019, 6 Pages.
Notice of Rejection in Japanese Application No. 2019-142131 dated Oct. 27, 2020, 25 pages.
First Office Action for Chinese Application No. 201610052732.4 dated Aug. 7, 2019, 29 pages.
First Office Action in Chinese Application No. 201610052732.4 dated Nov. 22, 2018, 18 pages.
Jiehan Yu, et al., The Research of Taxi Mobile Phone Application Profit Pattern, Technology & Economy in Areas of Communications , Apr. 30, 2014, vol. 16, No. 2, p. 63 to 65.
Chinese Search Report in 201510516205.X dated Feb. 4, 2017, 16 pages.
International Search Report in PCT/CN2016/092300 dated Oct. 31, 2016, 5 pages.
Written Opinion in PCT/CN2016/092300 dated Oct. 31, 2016, 4 pages.
The Third Office Action in Chinese Application No. 201610144422.5 dated Jun. 1, 2020, 22 pages.
Notice of Rejection in Japanese Application No. 2017566075 dated Feb. 26, 2019, 16 pages.
First Office Action in Chinese Application No. 201610144422.5 dated Mar. 5, 2019, 17 pages.
European Search Report in European Application No. 16829882.6 dated Mar. 22, 2018, 7 pages.
Third Office Action in Chinese Application No. 201610052732.4 dated Jan. 3, 2020, 27 pages.

* cited by examiner

1300

Comparing the number of service requests in a region from which the service requests are transmitted within a first preset time period with the number of currently available driver terminals — 1310

Determining that a strategy of price adjustment may be applied to the current service requests on the occurrence that the number of the service requests is greater than the number of available driver terminals — 1320

1410 — In a case that the number of service requests m in a region from which the service requests are transmitted within a first preset time period is greater than the number of currently online and available driver terminals n, acquiring unit prices of the m service requests 1420 — Obtaining a ranking x of a current service request by arranging the unit prices of the m service requests from largest to smallest 1430 — Applying a strategy of price adjustment to the current service request on the occurrence that x is greater than m-n

FIG. 14

METHOD AND SYSTEM FOR DETERMINING TRANSPORT SERVICE FEE

CROSS-REFERENCE TO RELATED APPLICATIONS

This application is a continuation of international Application No. PCT/CN2016/092300, filed on Jul. 29, 2016, designating the United States of America, which claims priority of Chinese Application No. 201510456622.X filed on Jul. 29, 2015, Chinese Application No. 201510516213.4 filed on Aug. 20, 2015, Chinese Application No. 201510516205.X filed on Aug. 20, 2015, Chinese Application No. 201610052732.4 filed on Jan. 26, 2016 and Chinese Application No. 201610144422.5 filed on Mar. 14, 2016, the entire contents of each of which are hereby incorporated by reference.

TECHNICAL FIELD

This application generally relates to a system and method for determining a transport service fee, and in particular, to a system and method for determining a transport service fee in an on-demand transport service.

BACKGROUND

Currently, on-demand services is becoming increasingly popular. In on-demand transport services, passengers and dirvers usually concern about transport service fee. A good method to estimate a transport service fee before the transport service begins and to calculate and show the transport service fee during progess of the transport service may improve the user experiences of both the drivers and the passengers and may smooth the transport service. Therefore, a system and method for determining a transport service fee is needed.

SUMMARY

In one aspect of the present disclosure, a system is provided. The system may include a processor and a computer-readable storage medium storing a set of instructions. When the set of instructions is executed by the processor, the processor is directed to: obtain a service request from a passenger terminal, wherein the service request includes starting point information and destination information; determine an estimated transport service fee based on the service request; obtain a price adjustment condition based on the service request, wherein the price adjustment condition is related to the starting point or historical information of the passenger terminal or a driver terminal; determine an amount of the price adjustment based on the price adjustment condition; determine an estimated transport service fee after the price adjustment based on the amount of the price adjustment and the estimated transport service fee; and send the estimated transport service fee after the price adjustment to the passenger terminal.

In another aspect of the present disclosure, a method is provided. The method may include: obtaining a service request transmitted from a passenger terminal, wherein the service request includes starting point information and destination information; determining an estimated transport service fee based on the service request; obtaining a price adjustment condition based on the service request, wherein the price adjustment condition is related to the starting point or historical information of the passenger terminal or a driver terminal; determining an amount of the price adjustment based on the price adjustment condition; determining an estimated transport service fee after the price adjustment based on the amount of the price adjustment and the estimated transport service fee; and sending the estimated transport service fee after the price adjustment to the passenger terminal.

In one aspect of the present disclosure, a non-transitory computer-readable storage medium is provided. The non-transitory computer-readable storage medium may include a set of instructions executed by a processor. The set of instructions may include: obtaining a service request from a passenger terminal, wherein the service request includes starting point information and destination information; determining an estimated transport service fee based on the service request; obtaining a price adjustment condition based on the service request, wherein the price adjustment condition is related to the starting point or historical information of the passenger terminal or a driver terminal; determining an amount of the price adjustment based on the price adjustment condition; determining an estimated transport service fee after the price adjustment based on the amount of the price adjustment and the estimated transport service fee; and sending the estimated transport service fee after the price adjustment to the passenger terminal.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

In order to illustrate the technical solutions related to the embodiments of the present disclosure, brief introduction of the drawings referred to the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

FIG. 13 is a flowchart of an exemplary process for determining whether to make a price adjustment according to some embodiments of the present disclosure;

FIG. 14 is a flowchart of an exemplary process for determining whether to make a price adjustment according to some embodiments of the present disclosure;

DETAILED DESCRIPTION

Figure 1:
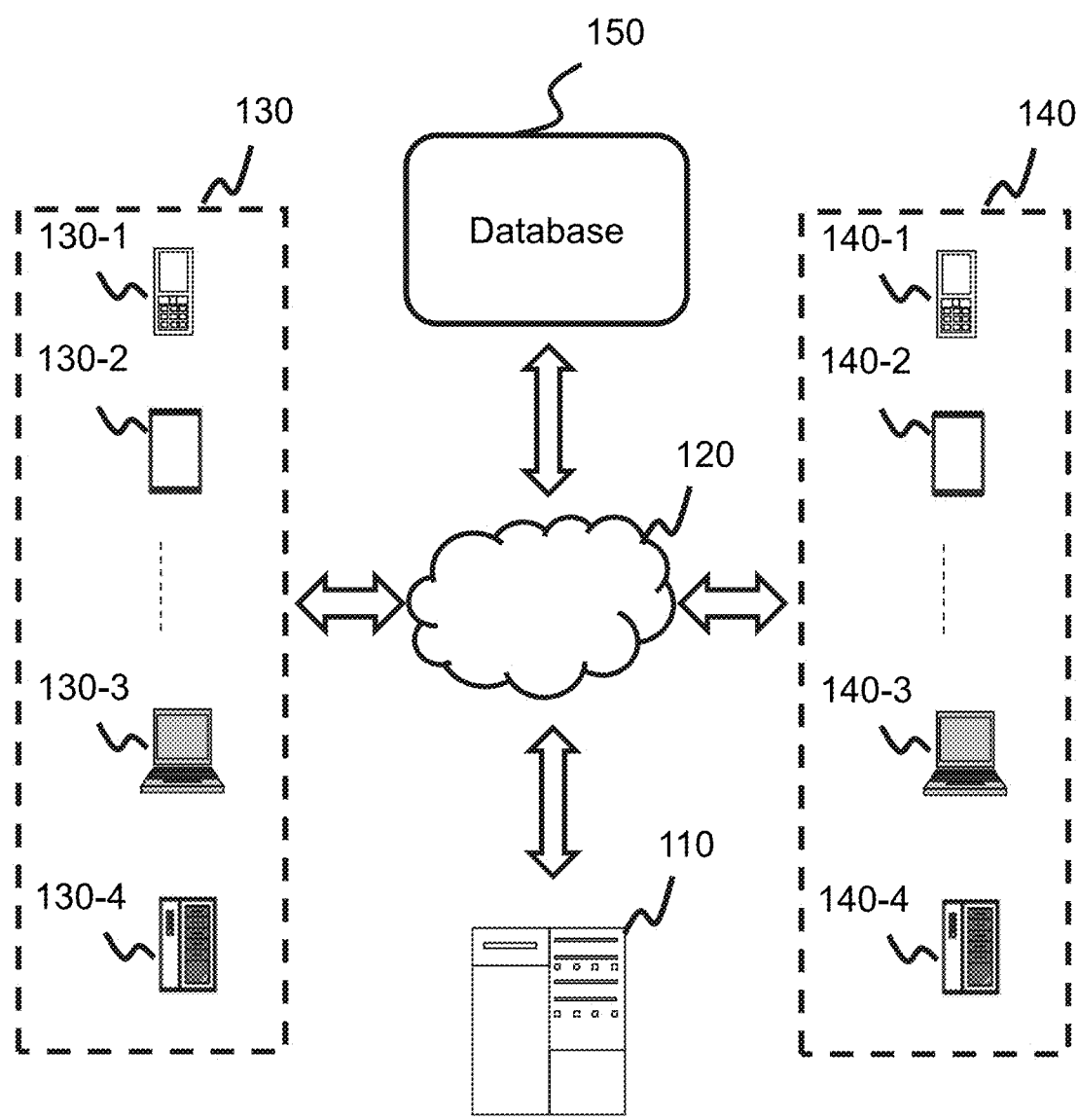
FIG. 1 is a schematic diagram of an exemplary network environment of a transport service fee determination system according to some embodiments of the present disclosure.

In order to illustrate the technical solutions related to the embodiments of the present disclosure, brief introduction of the drawings referred to the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "device," "apparatus," "unit," "module," "component," and/or "subunit used herein are one method to distinguish different components, elements, parts, section or assembly of different level in ascending order. However, the terms may replace each other or be displaced by other expression if they may achieve the same purpose.

While the present disclosure makes various references to certain modules, units and/or sub-units in the system according to the embodiments of the present disclosure. However, any number of different modules, units and/or sub-units may be used and ran on the client and/or server. The modules are merely for illustration, and different aspects of the system and method may use different modules, units and/or sub-units.

Figure 2:
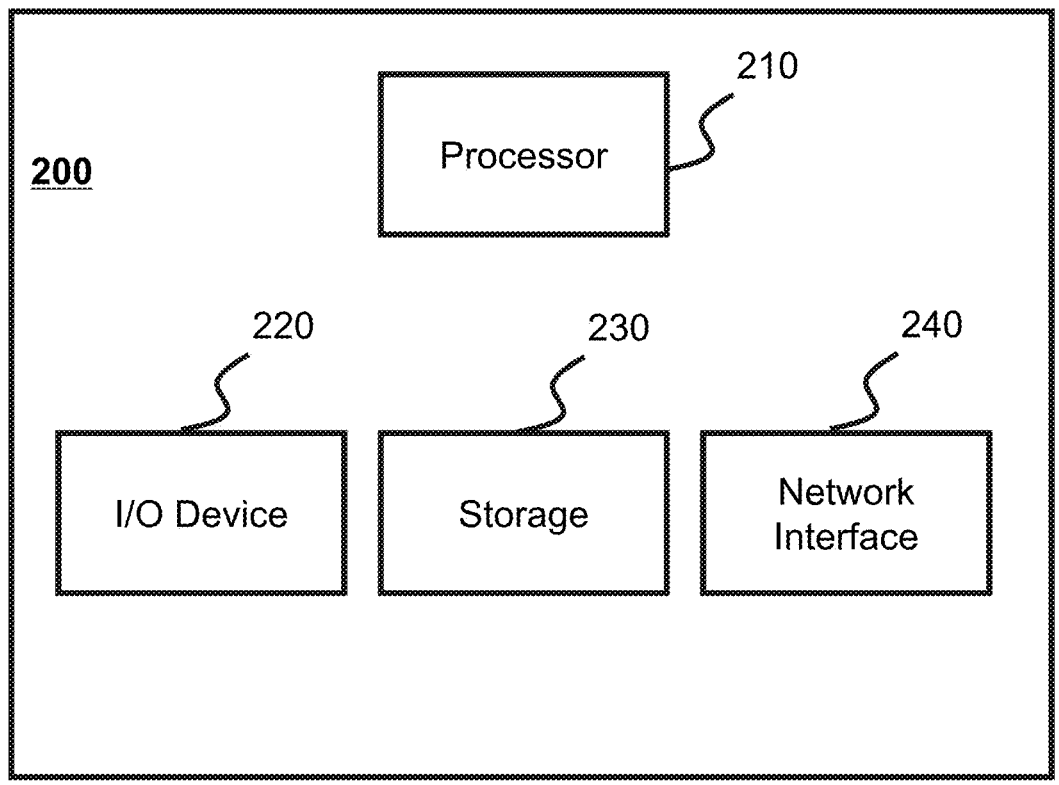
FIG. 2 is a block diagram of an exemplary server according to some embodiments of the present disclosure.

Generally, the word "module," "unit," or "sub-unit," as used herein, refers to logic embodied in hardware or firmware, or to a collection of software instructions. A module, a unit, or a sub-unit described herein may be implemented as software and/or hardware and may be stored in any type of non-transitory computer-readable medium or other storage device. In some embodiments, a software module/unit/sub-unit may be compiled and linked into an executable program. It will be appreciated that software modules can be callable from other modules/units/sub-units or from themselves, and/or may be invoked in response to detected events or interrupts. Software modules/units/sub-units configured for execution on computing devices (e.g., processor 210 as illustrated in FIG. 2) may be provided on a computer readable medium (e.g., storage 230), such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/sub-units may be included of connected logic components, such as gates and flip-flops, and/or can be included of programmable units, such as programmable gate arrays or processors. The modules/units/sub-units or computing device functionality described herein may be implemented as software modules/units/sub-units, but may be represented in hardware or firmware. In general, the modules/units/sub-units described herein refer to logical modules/units/sub-units that may be combined with other modules/units/sub-units or divided into sub-modules/units/sub-units despite their physical organization or storage.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a webpage, a plug-in of a browser, a client terminal, a custom system, an internal analysis system, an artificial intelligence robot, or the like, or any combination thereof. It should be understood that application scenarios of the system and method disclosed herein are only some examples or embodiments. Those having ordinary skills in the art, without further creative efforts, may apply these drawings to other application scenarios. For example, other similar service systems.

The term "passenger," "requester," "service requester," and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger," "user equipment," "user terminal," and "passenger terminal" may be used interchangeably, and "driver" and "driver terminal" may be used interchangeably. The term "service request" and "order" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

The positioning technology used in the present disclosure may be based on a global positioning system (GPS), a global navigation satellite system (GLONASS), a Beidou navigation system, a Galileo positioning system, a quasi-zenith satellite system (QZSS), a wireless fidelity (WiFi) positioning technology, or the like, or any combination thereof. Although in some embodiments, the use of GPS positioning techniques (e.g., a GPS modules, GPS coordinates, or location data points) may be illustrated, it should be that other positioning techniques may be used in the present disclosure.

FIG. 1 is a schematic diagram of an exemplary network environment for a transport service fee determination system according to some embodiments of the present disclosure. Network environment 100 may include a transport service server 110 (referred to as "server 110"), a network 120, a passenger terminal device 130, a driver terminal device 140 and a database 150. In some embodiments the server 110 may be configured to process a service request, calculate a transport service fee and return the transport service fee to the passenger terminal device 130 and/or the driver terminal device. The server 110 may be a server, or a server group. The server group may be centralized (e.g., a data center) or distributed (e.g., a distributed system). The server 110 may be local or remote. In some embodiments, the server 110 may access information of the passenger terminal device 130 and/or the driver terminal device, the database 150, via the network 120.

The network 120 may facilitate exchange of information. The network 120 may be a single network or a combination of multiple networks. Merely by way of example, the network 120 may include but is not limited to a local area network (LAN), a wide area network (WAN), a public network, a private network, a wireless local area network (WLAN), a virtual network, a metropolitan area network, a public telephone switched network (PSTN), or the like, or any combination thereof. The network 120 may include but is not limited to one or more network access points. For example, the network 120 may include but is not limited to wired or wireless network access points, base stations or network switch points, through which the server 110, the passenger terminal device 130, the driver terminal device 140 and the database 150 may be connected to the network 120 to receive and transmit information via the network 120.

In the present disclosure, "passenger" may be a party that needs a transport service or transmits a service request and "driver" may be a party that privides a transport service or helps to provide a transport service. In the present disclosure, "passenger" and "passenger terminal device" may be used interchangeably. "Passenger" may also include a user of the passenger terminal device 130. In some embodiments, the user of the passenger terminal device 130 may not be the actual passenger. For example, user A of the passenger terminal device 130 may use the passenger terminal device 130 for passenger B to send a service request, or receive other information or instruction sent by the server 110. For convenience, the user of the passenger terminal device 130 in the present disclosure may be referred to a passenger. In this disclosure, "driver" and "driver terminal device" may be used interchangeably. The driver may also include a user of the driver terminal device 140. In some embodiments, the user of the driver terminal device 140 may not be the actual driver. For example, user C of the driver terminal device 140 may use the driver terminal device 140 for driver D to receive service requests or other information or instructions sent by the server 110. For convenience, the user of the driver terminal device 140 may be referred to a driver.

In some embodiments, the passenger terminal device 130 may include but is not limited to a mobile device 130-1, a tablet computer 130-2, a laptop computer 130-3, a built-in device of a vehicle 130-4, or the like, or any combination thereof. The mobile device 130-1 may include but is not limited to a smart home device, a wearable device, an intelligent mobile device, a virtual reality device, an augmented reality device, or the like, or any combination thereof. The smart home device may include but is not limited to an intelligent lighting device, an intelligent electrical control device, an intelligent monitoring device, a smart television, a smart camera, an interphone, or the like, or any combination thereof. The wearable device may include but is not limited to a smart band, a pair of smart shoes or socks, a pair of smart glasses, a smart helmet, a smart headband, a smart clothing, a smart backpack, a kind of smart accessories, or the like, or any combination thereof. The intelligent mobile device may include but is not limited to a smart phone, a personal digital assistance (PDA), a smart watch, a laptop computer, a tablet computer, a built-in device of a vehicle (e.g., a car computer or a car TV, etc.), a game device, a navigation equipment, a POS machine, or the like, or any combination thereof. The virtual reality or augmented reality device may include but is not limited to a virtual reality helmet, a pair of virtual reality glasses, a pair of virtual reality goggles, an augmented reality helmet, a pair of augmented reality glasses, a pair of augmented reality goggles, or the like, or any combination thereof. For example, Google™ Glass, Oculus Rift™, HoloLens, Gear™ VR, or the like. The built-in device of a vehicle 130-4 may be a carputer or the like. In some embodiments, the passenger terminal device 130 may be a device with a positioning function for locating the position of the passenger or the passenger terminal device 130. In some embodiments, the driver terminal device 140 may include but is not limited to one or more of the same or similar devices as the passenger terminal device 130. In some embodiments, the driver terminal device 140 may be a device with a positioning function for locating the position of the driver or the driver terminal device 140. In some embodiments, the passenger terminal device 130 and/or the driver terminal device 140 may communicate with other positioning devices to realize the localization. In some embodiments, the passenger terminal device 130 and/or the driver terminal device 140 may send location information to the server 110.

In some embodiments, the database 150 may generally refer to a device having a storage function. The database 150 may store the data collected from the passenger terminal device 130 and/or the driver terminal device 140. The database 150 may also store various data generated during the work of the server 110. The database 150 may be local or remote. The database 150 may include but is not limited to a hierarchical database, a networked database, a relational database, or the like, or any combination thereof. The database 150 may digitize the information and then store the digitized information in the storage device by an electrical method, a magnetic method, an optical method, or the like by electrical, magnetic, or optical storage device. The database 150 may be used to store various types of information such as software and data. The database 150 may be a device that stores information by electrical energy, e.g., varous memories, a random access memory (RAM), a read-only memory (ROM), etc. The random access memory may include but is not limited to but is not limited to a decimal counting tube, a selectron tube, a delay line memory, a Williams tube, a dynamic random access memory (DRAM), a static random access memory (SRAM), a thyristor random access memory (T-RAM)), a zero-capacitor random access memory (Z-RAM), or the like, or any combination thereof. The read-only memory may include but is not limited to but is not limited to a magnetic bubble memory, a magnetic button memory, a thin-film memory, a plated wire memory, a magnetic-core memory, a magnetic drum memory, an optical driver, a hard disk, a magnetic tape, a non-volatile random access memory (NVRAM), a phase change memory, a magnetoresistance random access memory, a ferroelectric random access memory, a non-volatile static random access memory, a flash memory, an electronically erasable and rewritable read-only memory, an erasable and programmable read-only memory, a programmable read-only memory, a mask ROM, a floating connection door random access memory, a nano random memory, a racetrack memory, a variable resistive random-access memory, a programmable metallization cell, or the like, or any combination thereof. The database 150 may be a device that stores information by magnetic energy method, e.g., a hard disk, a soft disk, a tape, a magnetic core storage, a bubble memory, a U-Disk, a flash memory, etc. The database 150 may be a device that stores information by an optical method, e.g., a CD, a DVD, etc. The database 150 may be a device that stores information by the magneto-optical method, e.g., a magneto-optical disk, etc. Access modes of the database 150 may include but is not limited to random access mode, serial access mode, read-only access mode, or the like, or any combination thereof. The database 150 may be a non-permanent memory, or a permanent memory. The storage devices described above is only examples. The storage devices used in the system are not intended to be limiting.

The database 150 may be interconnected or communicated with the network 120, or directly connected to or communicated with the server 110 or a part thereof. In some embodiments, the database 150 may be configured in the background of the server 110. In some embodiments, the database 150 may be independent and connected to the network 120 directly. The passenger terminal device 130 and/or the driver terminal device 140 may access the information in the database 150 through the network 120, when the database 150 is interconnected or communicated with the network 120. Database 150 or other storage devices within the system may generally refer to any medium with reading/writing function. The database 150 or other storage devices within the system may be internal or external to the system. The connection between the database 150 and other storage devices or other modules within the system may be wired or wireless. The network 120 may facilitate exchange of information.

The connection between the server 110, or a part of the server 110 and/or the terminal device 130/140 and the connection between the server 110 and the database 150 may be different. The access permission of each party to the database 150 may be limited. For example, the server 110, or a part of it, may have access permission to the database 150 and read or modify public or personal information from the database 150; the passenger terminal device 130 and/or the driver terminal device 140 may read some of the public information or personal information related to the user, when the passenger terminal device 130 and/or the driver terminal device 140 meets certain conditions. For example, the server 110 may update/modify the public information or personal information related to the user, based on the one or more experience of using the server 110 by a user (e.g., passenger or driver). For another example, a driver terminal device 140 may view partial information related to the passenger terminal device 130 in the database 150 upon a receipt of a service request from the passenger terminal device 130; however, the driver terminal device 140 may not modify the information related to the passenger terminal device 130 in the database 150 independently, but may report to the server 110. The server 110 then decides whether to modify the information related to the passenger terminal device 130 in the database 150.

In some embodiments, information exchanging of one or more components in the transport service fee determination system 100 may be initiated by way of requesting a service. The object of the service request may be any product. In some embodiments, the product may include a food, a medicine, a commodity, a chemical product, an electrical appliance, clothing, a car, housing, a luxury, or the like, or any combination thereof. In some other embodiments, the product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal device, a program, a system, or the like, or any combination thereof. The mobile terminal device may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application related to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

In some embodiments, the database 150 may be a cloud computing platform with data storage function including but not limited to a public cloud platform, a private cloud platform, a community cloud platform, a hybrid cloud platform, etc. All such transformations are within the protection scope of the present disclosure.

FIG. 2 is a block diagram of an exemplary processor 200 (referred to as server 200) according to some embodiments of the present disclosure. The server 200 may include but is not limited to a transport service processor 210 (referred to as "processor 210"), an input/output device 220, a memory 230, and a network interface 240. Some or all of the above devices may be connected to the network 120. The above-mentioned devices may be centralized or distributed. One or more of the above-mentioned devices may be local or remote. In some embodiments, the server 110, the passenger terminal device 130, and/or the driver terminal device 140 may have the same or similar structure and/or configuration as the server 200 shown in FIG. 2. In some embodiments, the one or more functions performed by the server 110, the passenger terminal device 130, and/or the driver terminal device 140 described in the present disclosure may be implemented by the same or similar structure and/or configuration of the server 200 shown in FIG. 2.

The processor 210 may control the operation of the server 200 by computer program instructions. These computer program instructions may be stored on one or more memories 230. The above-mentioned one or more processors 210 may include but is not limited to a microcontroller, a reduced instruction-set computer (RISC), an application specific integrated circuit (ASIC), an application specific instruction-set processor (ASIP), a central processing unit (CPU), a graphic processing unit (GPU), a physical processing unit (PPU), a microprocessor unit, a digital signal processor (DSP), a field programmable gate array (FPGA), or other circuits or processors capable of executing the computer program instructions, or any combination thereof.

The input/output device 220 may implement the interaction of the passenger terminal device 130 and/or the driver terminal device 140 with the server 200. In some embodiments, the input/output device 220 may collect information from the passenger terminal device 130 and/or the driver terminal device 140 through the network 120. In some embodiments, the input/output device 220 may send information to the passenger terminal device 130 and/or the driver terminal device 140 through the network 120. In some embodiments, the way that the input/output device 220 sends information to the server 200 may include but is not limited to a keyboard input, a touch screen input, a mouse input, a camera, a scanner, a tablet input, a voice input, or the like, or any combination thereof. In some embodiments, the way that the input/output device 220 outputs information may include but is not limited to a display, a printer, a speaker, or the like, or any combination thereof. The form of the output may include but is not limited to numbers, characters, pictures, audios, videos, or the like, or any combination thereof.

The memory 230 may be used to store various information such as the computer program instructions and data of the control server 200. The above-mentioned one or more memories 230 may be the devices that store information using electrical energy. For example, the one or more memories 230 may include but is not limited to various memories, random access memories (RAM), read only memories (ROM), or the like, or any combination thereof. The random access memories may include but is not limited to decimal counting tubes, selectron tubes, delay line memories, Williams tubes, dynamic random access memories (DRAM), static random access memories (SRAM), thyristor random access memories (T-RAM)), zero-capacitor random access memories (Z-RAM), or the like, or any combination thereof. The read-only memories may include but is not limited to magnetic bubble memories, magnetic button memories, thin-film memories, plated wire memories, magnetic-core memories, magnetic drum memories, optical drivers, hard disks, magnetic tapes, non-volatile random access memories (NVRAM), phase change memories, magnetoresistance random access memories, ferroelectric random access memories, non-volatile static random access memories, flash memories, electronically erasable and rewritable read-only memories, erasable and programmable read-only memories, programmable read-only memories, mask ROMs, floating connection door random access memories, nano random memories, racetrack memories, variable resistive random-access memories, programmable metallization cells, or the like, or any combination thereof. The above-mentioned one or more memories 230 may be the devices that store information using magnetic energy, such as hard disks, floppy disks, magnetic tapes, magnetic core memories, magnetic bubble memories, U disks, flash memories, or the like. The above-mentioned one or more memories 230 may be the devices that store information optically, such as CDs, DVDs, or the like. The above-mentioned one or more memories 230 may be the devices that store information by magneto-optical means, such as magneto-optical disks or the like. The access modes of the above-mentioned one or more memories 230 may be random storages, serial access storages, read-only storages, or the like, or any combination thereof. The above-mentioned one or more memories 230 may be non-permanent memories, or permanent memories. It should be noted that the above description of the memories 230 is provided for the purposes of illustration, and not intended to limit the scope of the memories. The above-mentioned one or more memories 230 may be local, remote, or on a cloud server.

The network interface 240 may implement communication between part or all of services of the server 200 and the passenger terminal device 130 and/or the driver terminal device 140 through the network 120. In some embodiments, the network interface 240 may enable communication among part or all of the devices of the server 200 through the network 120. In some embodiments, the network interface 240 may be wired or wireless. The network interface 240 may include but is not limited to a metal cable, an optical fiber, a hybrid cable, a connection circuit, other wired network interface, or the like, or any combination thereof.

The network interface 240 may include but is not limited to a wireless local area network (WLAN) interface, a local area network (LAN) interface, a wide area network (WAN) interface, a Bluetooth connection, a ZigBee interface, a near field communication (NFC) interface, or the like, or any combination thereof.

Figure 3:
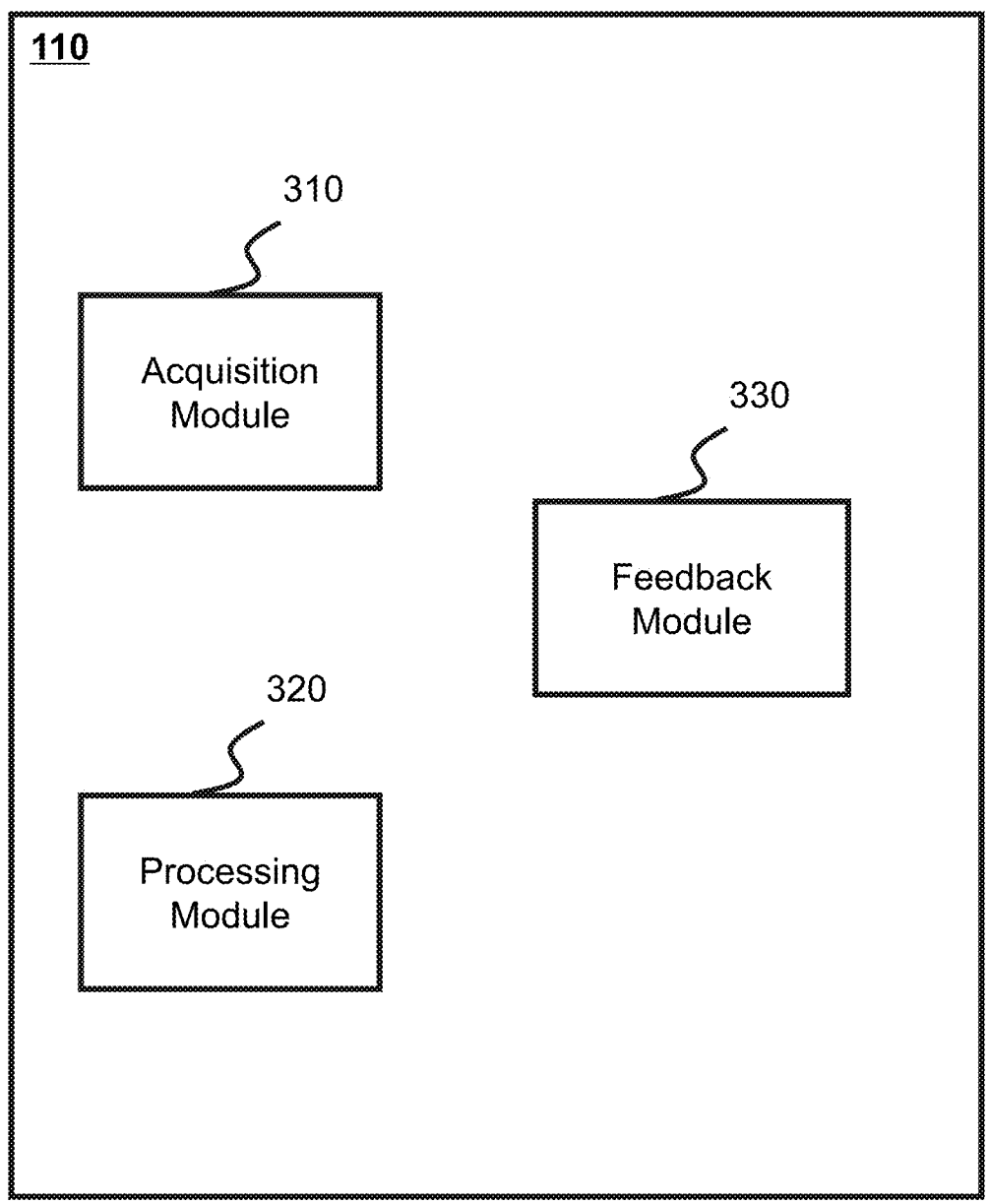
FIG. 3 is a block diagram of an exemplary server according to some embodiments of the present disclosure.

FIG. 3 is a block diagram of an exemplary transport service server 110 (or abbreviated as "server 110"). The server 110 may include but is not limited to an acquisition module 310, a processing module 320, and a feedback module 330. In some embodiments, the server 110 may be part of the transport service server 200 for determining a transport service fee.

Part or all of the above-mentioned modules may be connected to the network 120. The above-mentioned modules may be centralized or distributed. One or more of the above-mentioned modules may be local or remote. In some embodiments, the function of the one or more modules may be implemented by one or more processors 210. In some embodiments, the function of the one or more modules may also be performed by one or more processors 210, one or more I/O devices 220, one or more memories 230, one or more network interfaces 240, or the like, or any combination thereof.

The acquisition module 310 may obtain the required information in a variety of ways. In some embodiments, the way of obtaining information may be direct or indirect. For example, the acquisition module 310 may obtain information direclty from one or more passenger terminal devices 130 and/or driver terminal devices 140 directly through the network 120), or obtain information indirectly through the database 150, the processing module 320, or the feedback module 330. In some embodiments, the information obtained by the acquisition module 310 may include but is not limited to a service request, the number of the driver terminal devices 140, an acceptance probability, an order snatching probability, a location data packet, map information, or the like, or any combination thereof. The service request may include but is not limited to starting point information, destination information, a passenger identity of the passenger terminal device 130, or the like, or any combination thereof. In some embodiments, the passenger identity may include but is not limited to a mobile number, an identity (id for short), a media access control (MAC for short) address, or the like, or any combination thereof.

The processing module 320 may perform data processing on the obtained information. The obtained information may include but is not limited to a service request, the number of the driver terminal devices 140, an acceptance probability, an order snatching probability, a location data packet, map information, or the like, or any combination thereof. The source of the obtained information may include but is not limited to the acquisition module 310, the database 150, or the like. In some embodiments, the acquisition module 310 may obtain a service request, the number of the driver terminal devices 140, an acceptance probability, an order snatching probability, a location data packet, map information, or the like, directly from the passenger terminal device 130 and/or driver terminal device 140 (e.g., a mobile phone, a personal computer, a wearable device, a tablet computer, a smart TV, etc.). In some embodiments, the processing module 320 may send a request and/or receive information sent by the acquisition acquisition module 310. The information sent by the acquisition acquisition module 310 service request may include but is not limited to a service request, the number of driver terminal devices 140, an acceptance probability, an order snatching probability, a location data packet, map information, or the like. For example, the acquisition module 310 may transmit the information stored in the acquisition module 310 to the processing module 320 after a receipt of the request from the processing module 320.

The feedback module 330 may send information and instructions to the passenger terminal device 130 and/or the driver terminal device 140. In some embodiments, the feedback module 330 may send a request to the processing module 320 and receive the information sent by the processing module 320. In some embodiments, the processing module 320 may transmit the information stored in the processing module 320 to the feedback module 330 after a receipt of the request from the feedback module 330. The information provided by the feedback module 330 to the passenger terminal device 130 and/or the driver terminal device 140 may include but is not limited to an estimated transport service fee, a real-time transport service fee, whether to make a price adjustment, an amount of the price adjustment, or the like, or any combination thereof.

The feedback module 330 may transmit a service request to the acquisition module 310. The acquisiton module 310 may acquire the required information from the database 150 based on the service request. After the required information is acquired, the acquisition module 310 may transmit the information to the feedback module 330. In some embodiments, the acquisition module 310 may also transmit the information stored in the acquisition module 310 to the feedback module 330 after a receipt of the request from the feedback module 330. In some embodiments, the feedback module 330 may access the database 150 directly. For example, the feedback module 330 may transmit a request to the database 150 to obtain the required information, which may be transmitted to the feedback module 330. As another example, the database 150 may transmit information to the feedback module 330 without receiving a request. The feedback module 330 may transmit a request to the processing module 320, which may access the database 150 based on the request to obtain the required information. After the required information is acquired, the processing module 320 may transmit the information to the feedback module 330. In some embodiments, the processing module 320 may also transmit the information stored in the processing module 320 to the feedback module 330 upon a receipt of a request from the feedback module 330. The input information received by the feedback module 330 may include but is not limited to an estimated transport service fee, a real-time transport service fee, whether to make a price adjustment, an amount of the price adjustment, or the like, or any combination thereof.

In some embodiments, the acquisition module 310, the processing module 320, and the feedback module 330 may be realized by distributing them on individual integrated circuit modules, respectively, or distributing some of the modules on a single integrated circuit module. Similar variations are within the scope of the claims of the present disclosure.

Figure 4:
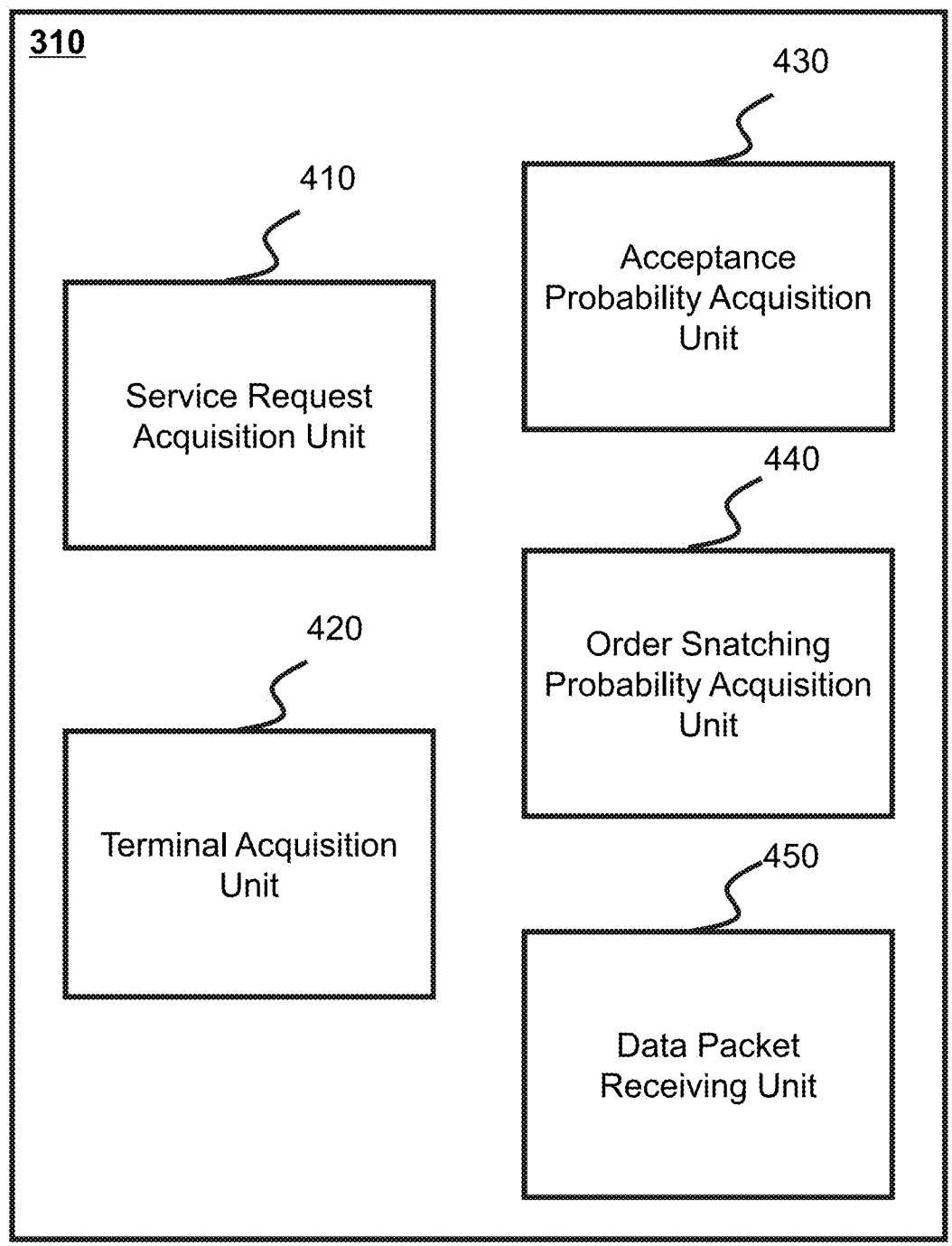
FIG. 4 is a block diagram of an exemplary acquisition module according to some embodiments of the present disclosure.

FIG. 4 is a block diagram of an exemplary acquisition module 310 according to some embodiments of the present disclosure. The acquisition module 310 may include a service request acquisition unit 410, a terminal acquisition unit 420, an acceptance probability acquisition unit 430, an order snatching probability acquisition unit 440, and a data packet receiving unit 450.

The service request acquisition unit 410 may acquire a service request. In some embodiments, the service request may be a service request transmitted by the passenger terminal 130 to the server 110. In some embodiments, the service request may include starting point information, destination information, a passenger identity of the passenger terminal 130, or the like, or any combination thereof.

The terminal acquisition unit 420 may acquire at least one driver terminal 140. In some embodiments, when the server 110 receives a service request transmitted by the passenger terminal 130, the terminal acquisition unit 420 may obtain at least one driver terminal 140 within a surrounding region of a starting point based on the starting point information in a service request.

The acceptance probability acquisition unit 430 may obtain an acceptance probability of the passenger terminal 130. In some embodiments, the acceptance probability acquisition unit 430 may obtain a first acceptance probability of the passenger terminal 130 before a price adjustment based on an amount of the price adjustment. In some embodiments, the acceptance probability acquisition unit 430 may obtain a second acceptance probability of the passenger terminal 130 after the price adjustment.

The order snatching probability acquisition unit 440 may obtain an order snatching probability of the driver terminal 140. In some embodiments, the order snatching probability acquisition unit 440 may obtain a first order snatching probability of the driver terminal 140 before the price adjustment based on an amount of the price adjustment. In some embodiments, the order snatching probability acquisition unit 440 may obtain a second order snatching probability from the driver terminal after the price adjustment. The data packet receiving unit 450 may receive a data packet including location data point transmitted by a client.

In some embodiments, the acquisition module 310 may also include other information acquisition units. For example, the acquisition module 310 may also include map information acquisition unit configured to acquire map information. In some embodiments, the acquisition module 310 may include any or a combination of the above-mentioned units. In some embodiments, any or a combination of the units in the acquisition module 310 may be integrated into a unit for performing a corresponding function.

Figure 5:
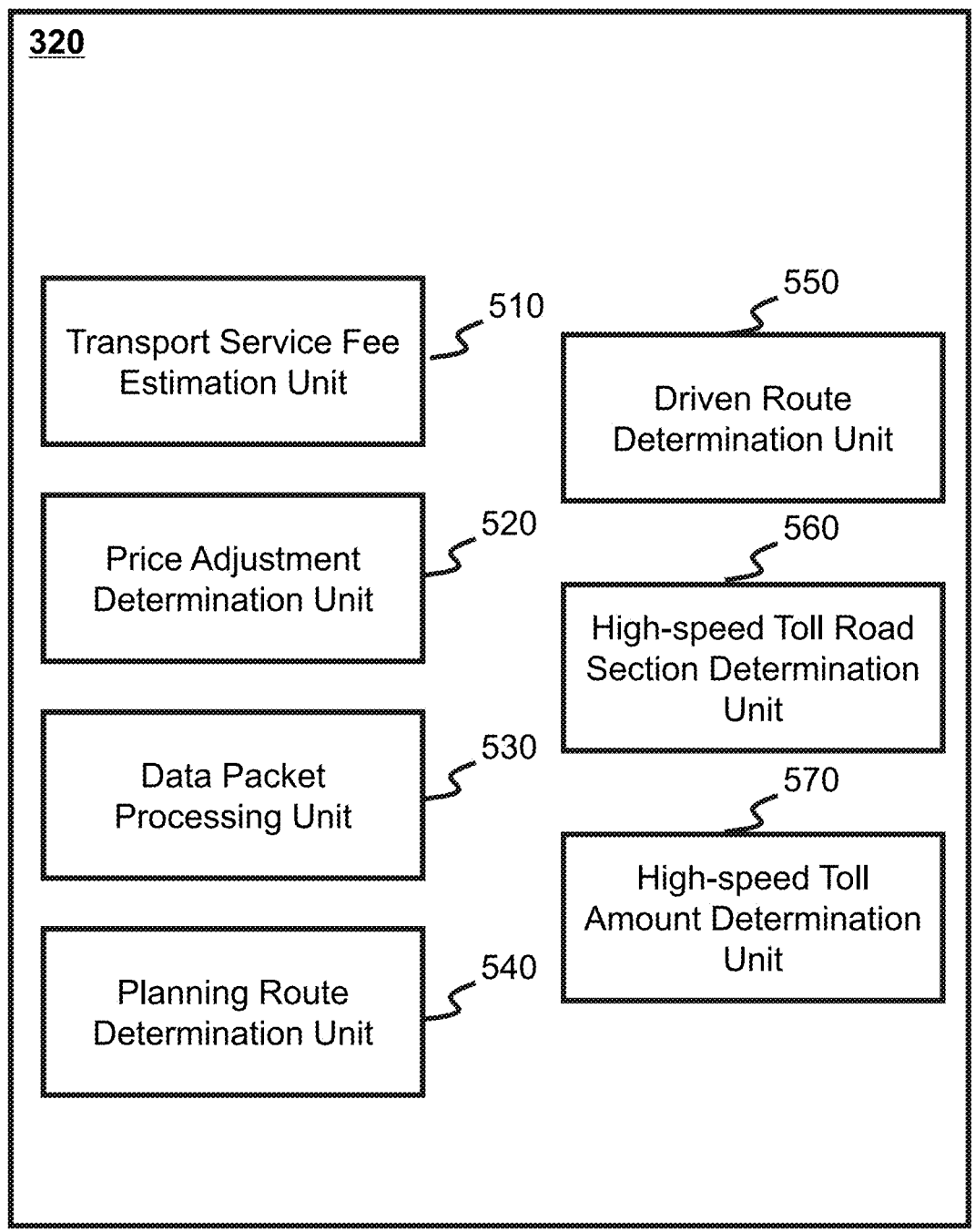
FIG. 5 is a block diagram of an exemplary processing module according to some embodiments of the present disclosure.

FIG. 5 is a block diagram of an exemplary processing module 320 according to some embodiments of the present disclosure. The processing module 320 may include a transport service fee estimation unit 510, a price adjustment determination unit 520, a data packet processing unit 530, a planning route determination unit 540, a driven route determination unit 550, a high-speed toll road section determination unit 560 and a high-speed toll amount determination unit.

The transport service fee estimation unit 510 may estimate the transport service fee. In some embodiments, the transport service fee estimation unit 510 may determine a first distance between the departure location and the destination and estimate the transport service fee based on the first distance and an estimating equation. In some embodiments, the transport service estimation unit 510 may also adjust the estimated transport service fee based on the relationship between the transport service fee and a starting price. In some embodiments, the transport service fee estimation unit 510 may also include a data acquisition sub-unit, a model training sub-unit and a preprocessor sub-unit, or the like, or any combination thereof. The data acquisition sub-unit may collect historical data in different time periods within a preset time range in at least one city. The model training sub-unit may train a default model to obtain an estimating equation. For example, the model training sub-unit may train a preset model based on the historical data of a same region and/or a same time period to obtain an estimating equation corresponding to the region and/or time period. The preprocessor sub-unit may preprocess the data. For example, the pre-processing sub-unit may determine the starting price in each city and/or each time period based on the information in the historical data, and may also perform noise reduction processing on the historical data.

The price adjustment determination unit 520 may determine a price adjustment strategy and/or an amount of the price adjustment corresponding to the service request. In some embodiments, the price adjustment determination unit 520 may obtain a price adjustment condition based on the service request, a price adjustment strategy, an amount of the price adjustment, or the like, or any combination thereof. The price adjustment determination unit 520 may also determine whether to make the price adjustment.

The data packet processing unit 530 may process received data packets. In some embodiments, the data packet processing unit 530 may determine whether the received data packets are valid. In some embodiments, the data packet processing unit 530 may determine valid data packets from the received data packets. If a data packet is determined valid, the data packet processing unit 530 may generate a real-time transport service fee based on the preset fee rule, the previous fee and the location data point in the data packet. If the data packet is determined invalid, the data packet processing unit 530 may discard the data packet. In some embodiments, the data packet processing unit 530 may also determine a sum of distances between the positions of the obtained location data points, determine a fee included in the currently received data packet based on the sum of distances between the positions of the location data points, determine a real-time transport service fee, etc. The "currently received data packet" in the present disclosure may be a data packet that the server 110 (the data packet processing unit 530 in the server 110) is processing. Herein, the "current" may indicate a time when the server 110 (the data packet processing unit 530 in the server 110) is processing the data packet.

In some embodiments, the data packet processing unit 530 may also include a time stamp acquisition sub-unit, a data packet determination sub-unit, a data packet discarding sub-unit, a data point addition sub-unit, a distance determination sub-unit, a distance sum determination sub-unit, a real-time transport service fee determination sub-unit, a data recording sub-unit, or the like, or any combination thereof. The time stamp acquisition sub-unit may obtain a first time stamp corresponding to the first location data point in the currently received data packet and a second time stamp corresponding to the last location data point in the previously received data packet. The data packet determination sub-unit may determine a sequence of the first time stamp and the second time stamp. The data packet discarding sub-unit may discard the received invalid data packet. The data packet discarding sub-unit may also discard the currently received data packet after determining a real-time transport service fee based on the currently received data packet. The data point addition sub-unit may add the last location data point in the previously received data packet to the currently received data packet. The distance determination sub-unit may determine a distance between each two adjacent location data points in the currently received data packet. The distance sum determination sub-unit may determine a sum of distances between the positions of the obtained location data points based on each two adjacent location data points, or determine a sum of distances between a plurality of positions corresponding to a plurality of location data points based on the distances between the positions. The real-time transport service fee determination sub-unit may determine a real-time transport service fee based on a preset fee rule, the previous fee and the sum of distances between the positions determined by the location data points. The data recording sub-unit may record the last location data point, the second time stamp corresponding to the last location data point and the previous fee in the currently received data packet.

Referring back to FIG. 5, the planning route determination unit 540 may determine a planning route based on the service request transmitted from the passenger terminal 130. In some embodiments, the planning route determination unit 540 may determine a planning route based on the starting point information, the destination information and/or the feedback information (e.g., first feedback information, second feedback information, or the like) in response to the inquiry information (e.g., first inquiry information or second inquiry information, or the like) of the service request.

The driven route determination unit 550 may determine a driven route based on the starting point information and the current position information from the service request. In some embodiments, the driven route determination unit 550 may determine a driven route between the starting point and the current position. The "current position" in the present disclosure may be a real-time position where the passenger terminal 130 and/or the driver terminal 140 is located when the processor 110 (the driven route determination unit 550 in the processor 110) determines a driven route. Herein, the "current" refers to a time when the driven route is determined.

The high-speed toll road section determination unit 560 may determine a high-speed toll road section of a driven route based on the driven route. The high-speed toll amount determination unit 570 may determine a high-speed toll amount based on the high-speed toll road section.

In some embodiments, the processing module 320 may include any or a combination of the units and/or sub-units mentioned above. In some embodiments, any or a combination of the above-mentioned units and/or sub-units in the processing module 320 may be integrated into a unit for performing a corresponding function.

Figure 6:
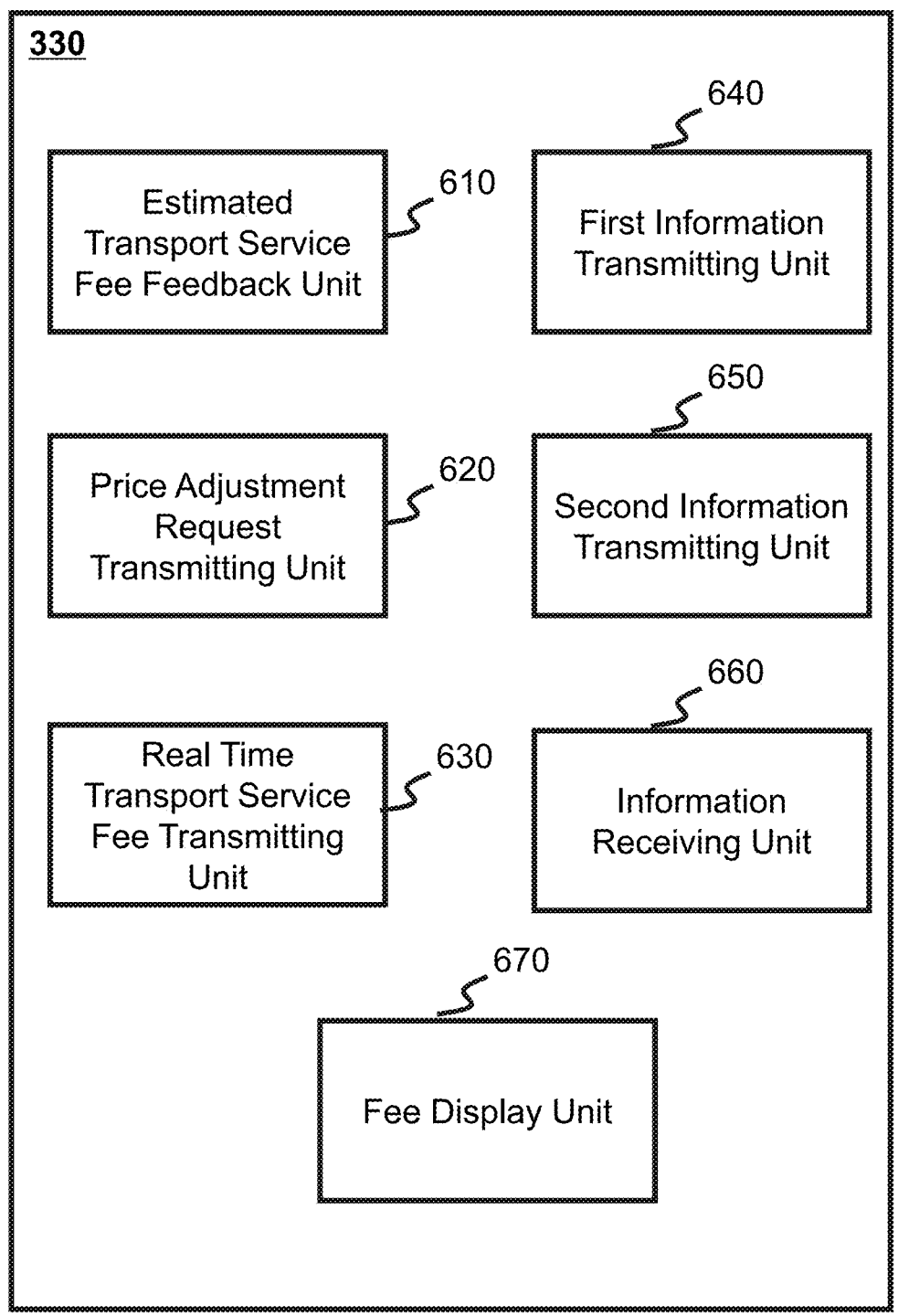
FIG. 6 is a block diagram of an exemplary feedback module according to some embodiments of the present disclosure.

FIG. 6 is a block diagram of an exemplary feedback module 330 according to some embodiments of the present disclosure. The feedback module 330 may include an estimated transport service fee feedback unit 610, a price adjustment request transmitting unit 620, a real-time transport service fee transmitting unit 630, a first information transmitting unit 640, a second information transmitting unit 650, an information receiving unit 660 and a fee display unit 670.

The estimated transport service fee feedback unit 610 may send a feedback regarding the estimated transport service fee to the passenger terminal 130, the driver terminal 140, the database 150, or the like, or any combination thereof. When a price adjustment strategy is determined to be applied, the price adjustment request transmitting unit 620 may transmit a price adjustment request to the passenger terminal 130. After the passenger terminal 130 and/or the driver terminal 140 arrives at the destination, the real-time transport service fee transmitting unit 630 may transmit the transport service fee to the passenger terminal 130 and/or the driver terminal 140.

The second information transmitting unit 650 may transmit first inquiry information inquiring whether to enter high-speed toll road sections to the passenger terminal 130 at the beginning of a trip. In the service, when the vehicle reaches a location that is a preset distance from each high-speed toll station, the first information transmitting unit 640 may transmit notification information that the vehicle is about to enter the toll road section to the passenger terminal 130. The information receiving unit 660 may receive the feedback of the passenger terminal 130 regarding the first inquity information and/or the second inquiry information. The fee display unit 670 may compile the fee information determined by the server 110 (e.g., the processing module 320 in the server 110). In some embodiments, the fee display unit 670 may display the compiled fee information to the passenger terminal 130, the driver terminal 140, or the like. In some embodiments, the fee display unit 670 may be part of the server 110, and the fee may not be displayed. In some embodiments, the fee display unit 670 may generate an estimated transport service fee, a real-time transport service fee, a basic mileage fee, a toll road section fee, a fee rule, or the like, or any combination thereof.

In some embodiments, the feedback module 330 may include any or a combination of the units and/or sub-units mentioned above. In some embodiments, the any or a combination of the above-mentioned units and/or sub-units in the feedback module 320 may be integrated into a unit for performing a corresponding function.

Figure 7:
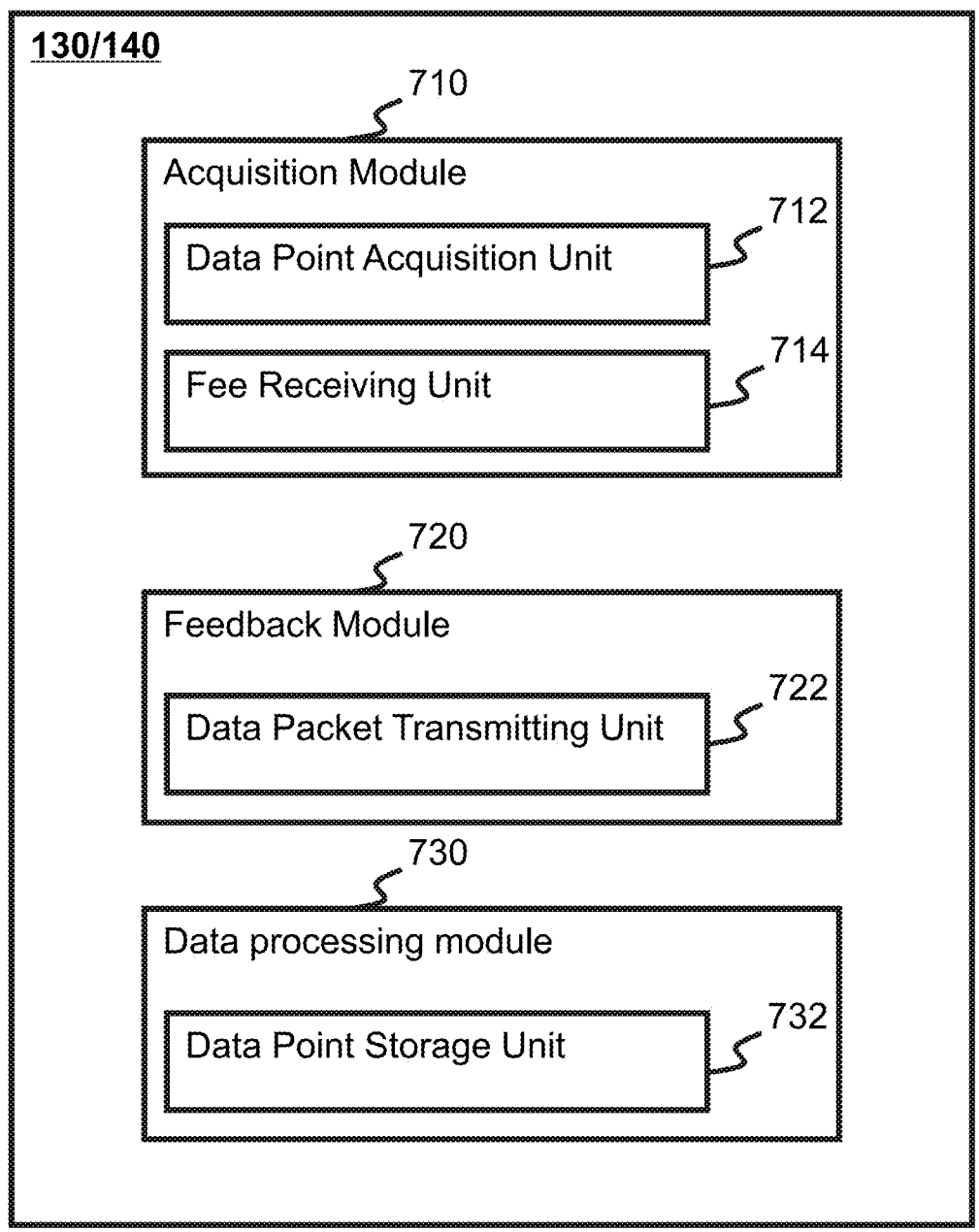
FIG. 7 is a block diagram of an exemplary passenger terminal and/or driver terminal according to some embodiments of the present disclosure.

FIG. 7 is a block diagram of an exemplary passenger terminal 130 and/or driver terminal 140 according to some embodiments of the present disclosure. In some embodiments, the passenger terminal 130 and/or the driver terminal 140 may include an acquisition module 710, a feedback module 720 and a processing module 730. In some embodiments, the acquisition module 710 may include a data point acquisition unit 712 and a fee receiving unit 714. The feedback module may include a data packet transmitting unit 722. The processing module 730 may include a data point storage unit 732.

The data point acquisition unit 712 may obtain a predetermined number of location data points. After the passenger terminal 130 and/or the driver terminal 140 reaches the destination, the fee receiving unit 714 may receive a real-time transport service fee transmitted by the server 110. The data packet transmitting unit 722 may transmit the data packet to the server 110. The data point storage unit 732 may receive a preset number of location data points and store them in a data packet.

In some embodiments, the passenger terminal 130 and/or the driver terminal 140 may include any or a combination of the above-mentioned modules/units. In some embodiments, any or a combination of the above-mentioned modules and/or units in the passenger terminal 130 and/or the driver terminal 140 may be integrated into a module and/or a unit for performing a corresponding function. In some embodiments, the passenger terminal 130 and/or the driver terminal 140 may also include a device with a positioning function for locating the position of the passenger, the passenger terminal 130, the driver or the driver terminal 140.

Figure 8:
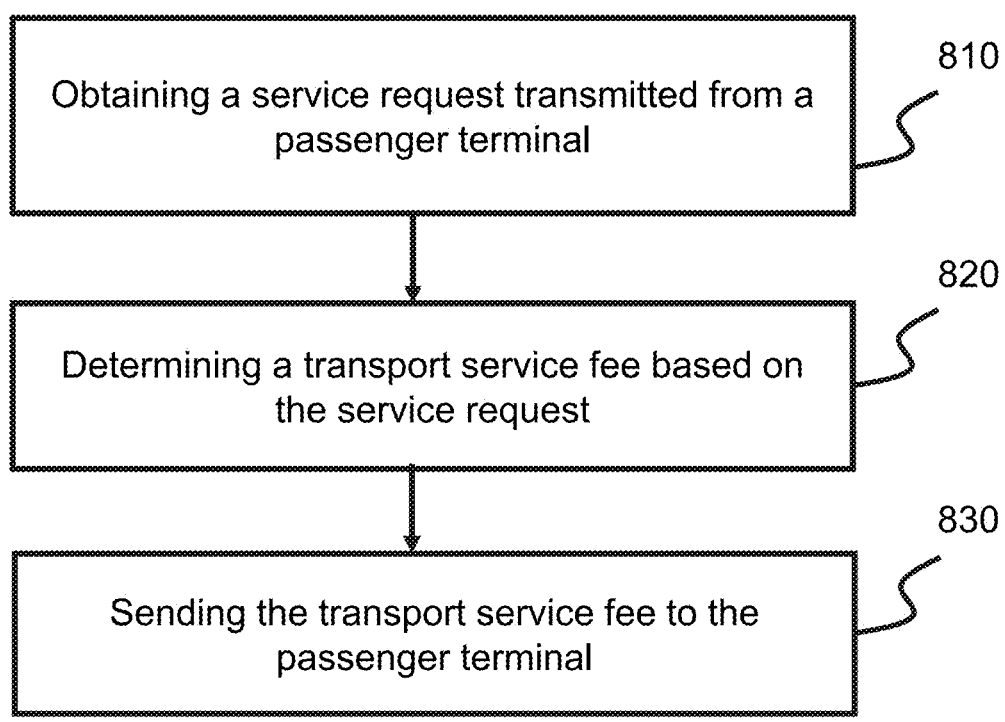
FIG. 8 is a flowchart of an exemplary process for generating a transport service fee feedback according to some embodiments of the present disclosure.

FIG. 8 is a flowchart of an exemplary process for generating a transport service fee feedback according to some embodiments of the present disclosure. In step 810, the server 110 (e.g., the acquisition module 310 of the server 110, or the service request acquisition unit 410 in the acquisition module 310) may obtain a service request transmitted by the passenger terminal 130. The service request may include starting point information, destination information, a passenger identity of the passenger terminal 130, or the like, or any combination thereof. In some embodiments, the passenger identity may include a mobile number, an identity code (ID), a MAC address, or the like, or any combination thereof.

In step 820, the server 110 (e.g., the processing module 320 of the server 110) may determine a transport service fee based on the service request. The transport service fee may include an estimated transport service fee and a real-time transport service fee. The estimated transport service fee may be an amount to be paid, determined by the server 110 based on the service request and other information before the start of the trip. The real-time transport service fee may be a real-time amount to be paid, determined by the server 110 based on the information such as the obtained location data points or the high-speed toll road sections.

In step 830, the server 110 (e.g., the feedback module 330 of the server 110, the estimated transport service fee feedback unit 610 and/or the real-time transport service fee transmitting unit 630 in the feedback module 330) may transmit the transport service fee to the passenger terminal 130 and/or the driver terminal 140.

Figure 9:
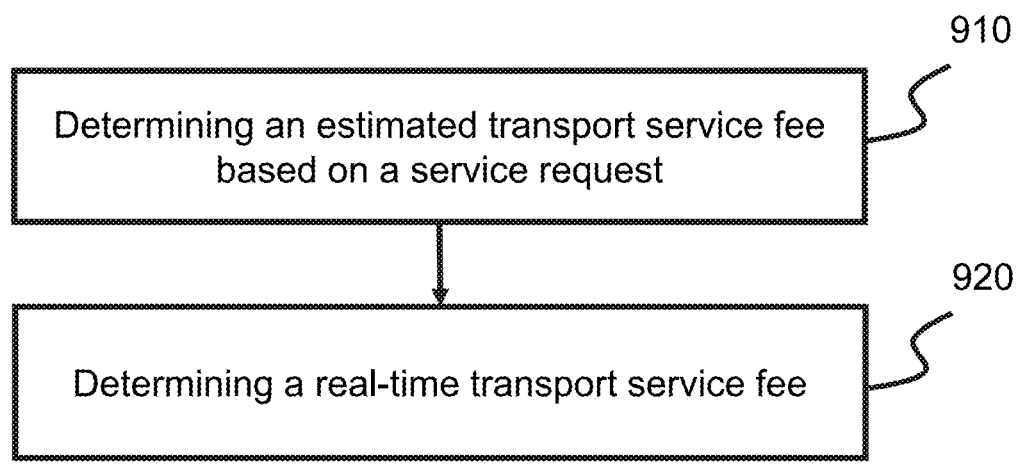
FIG. 9 is a flowchart of an exemplary process for determining a transport service fee according to some embodiments of the present disclosure.

Referring back to FIG. 8, step 820 may be implemented by the method 900 for determining the transport service fee as shown in FIG. 9. In some embodiments, the method 900 for determining the transport service fee may be implemented by performing step 910 alone. In some embodiments, the method 900 for determining the transport service fee may be implemented by performing step 920 alone. In some embodiments, the method 900 for determining the transport service fee may be implemented by performing step 910 and step 920 successively.

As shown in FIG. 9, in step 910, the server 110 (e.g., the processing module 320 of the server 110, or the transport service fee estimation unit 510 in the processing module 320) may determine the estimated transport service fee based on the service request. In some embodiments, step 910 may include determining an estimated transport service fee based on an estimating equation and/or determining a price adjustment strategy based on a price adjustment condition. The price adjustment strategy may be an amount of fare increase and/or a rate of fare increase.

In step 920, the server 110 (e.g., the processing module 320 of the server 110) may determine a real-time transport service fee. The information, based on which the real-time transport service fee is determined, may include a service request, a driven route, high-speed toll road section information, map library data, location data packet, or the like, or any combination thereof.

Figure 10:
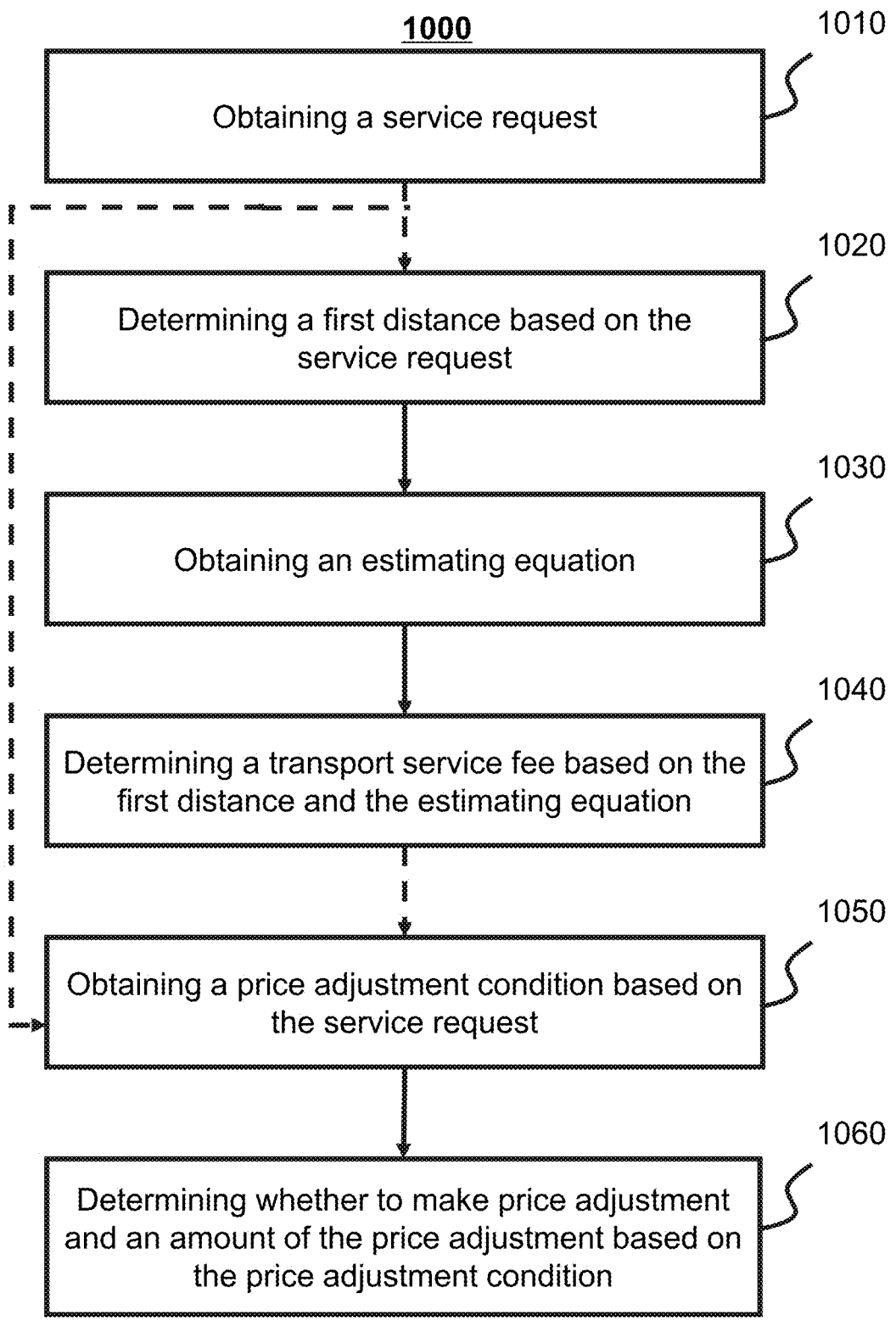
FIG. 10 is a flowchart of an exemplary process for determining a transport service fee according to some embodiments of the present disclosure.

Referring back to FIG. 9, step 910 may be implemented by the method 1000 for determining the estimated transport service fee as shown in FIG. 10. In some embodiments, the method 1000 for determining the estimated transport service fee may be implemented by performing steps 1010-1040. In some embodiments, the method 1000 for determining the estimated transport service fee may be implemented by performing steps 1010-1060. In some embodiments, the method 1000 for determining the estimated transport service fee may be implemented performed by performing step 1010, step 1050, and step 1060.

As shown in FIG. 10, in step 1010, the server 110 (e.g., the acquisition module 310 of the server 110, or the service request acquisition unit 410 of the acquisition module 310) may obtain a service request. The service request may include starting point information, destination information, a passenger identity of the passenger terminal 130 (e.g., a phone number, an identification code (ID), a MAC address, or the like, or any combination thereof). In some embodiments, the starting point information may be location information of the passenger terminal 130. In some embodiments, the server 110 may automatically read the starting point information from the passenger terminal 130. For example, when the passenger uses a passenger terminal 130 with a positioning function, the server 110 may automatically obtain the starting point information of the passenger based on the positioning function of the passenger terminal 130. For another example, when the passenger allows the service request softwares and/or applications to open the positioning function, the server 110 may automatically obtain the starting point information of the passenger terminal 130 at the moment the passenger terminal 130 sends the service request. The passenger terminal 130 may include a smartphone, a personal digital assistant, a tablet computer, a laptop computer, a carputer, a handheld game player, a pair of smart glasses, a smart watch, a wearable device, a virtual reality or augmented reality device (e.g., Google™ Glass, Oculus Rift™, HoloLens, Gear™ VR, etc), or other devices with similar functions.

In step 1020, the server 110 (e.g., the processing module 320 of the server 110, or the transport service fee estimation unit 510 in the processing module 320) may determine a first distance according to the service request. The first distance may be a spatial distance (such as a road distance or a water surface distance) for the vehicle (e.g., a vehicle, a ship, an aircraft, etc.) to travel from the start location to the destination. In some embodiments, the first distance may be a straight line distance between the start location and the destination. For example, the first distance may be the distance corresponding to the least time-consuming route between the start location and the destination. In some embodiments, the latitude and longitude coordinates of the start location and the destination may be obtained first, and the first distance may be determined based on the above-mentioned latitude and longitude coordinates and a map navigation.

In step 1030, the server 110 (e.g., the processing module 320 of the server 110, or the transport service fee estimation unit 510 in the processing module 320) may obtain an estimating equation. In order to ensure the accuracy of the estimated transport service fee, the server 110 may obtain an estimating equation of the same region and/or the same time period as the service request. The estimating equation may be a functional relationship between the distance and the estimated transport service fee. In some embodiments, the estimating equation may be obtained by training a model. The same region mentioned above may be the same administrative region, or the same geographical area (such as the North China Plain, etc.). In some embodiments, the same region may include the same city, the same area of the same city (such as Beijing Haidian District, etc), the same block or the same road. In some embodiments, the same region may be the same city. As the transport service fee between the rush hour and other time periods may be significantly different, one day may be divided into multiple time periods. For example, 7:00~9:00 (morning peak) may be set as a time period, 17:00 to 19:00 (evening peak) may be set as another time period. In some embodiments, the same time period may be a same time period during each day.

In step 1040, the server 110 (e.g., the processing module 320 of the server 110, or the transport service fee estimation unit 510 in the processing module 320) may determine the estimated transport service fee based on the first distance and the estimating equation. In some embodiments, the estimating equation may be an estimating equation of the same region and the same time period as the service request. In some embodiments, the region that the service request belongs to may be determined by the starting location. In some embodiments, the time period that the service request belongs to may be determined in accordance with the departure time in the service request. The estimating equation belonging to the same region and the same time period as the service request may be selected after determining the region and the time period that the service request belongs to. The estimated transport service fee may be determined by the first distance and the functional relationship between the distance and the estimated transport service fee described by the estimating equation.

In some embodiments, the server 110 (e.g., the feedback module 330 of the server 110, or the estimated transport service fee feedback unit 610 in the feedback module 330) may transmit the determined estimated transport service fee to the passenger terminal 130 and/or the driver terminal 140. The way of transmitting may include information push, prompt tone, pop-up window, short message, instant message, or the like, or any combination thereof of a taxi-hailing App (e.g., DiDi Taxi). The information may exist in forms of text, audio, video, picture, or the like, or any combination thereof.

In step 1050, the server 110 (e.g., the acquisition module 310 of the server 110) may obtain a price adjustment condition based on the service request. The price adjustment condition may include the number of service requests within a surrounding region of the starting point from the service request, the number of the currently available online driver terminals 140, the order snatching probability of the driver terminal 140, the acceptance probability information, the number of historical service requests and the number of completed historical service requests, the number of snatched orders of the driver terminal 140, or the like, or any combination thereof.

In step 1060, the server 110 (e.g., the processing module 320 of the server 110, or the price adjustment determination unit 520 of the processing module 320) may determine whether to make a price adjustment and/or the amount of the price adjustment based on the price adjustment conditions. In some embodiments, the server 110 may determine a supply-demand relationship between the number of service requests within a surrounding region of the starting point of the service request and the number of the driver terminals 140, and may determine whether to apply a price adjustment strategy to the currently received service requests based on the supply-demand relationship. In some embodiments, the server 110 may predict the acceptance of the passengers and/or the drivers to fare increase of the service request based on the price adjustment conditions (e.g., the order snatching probability of the driver terminal 140 and the acceptance probability of the passenger terminal 130), and transform the acceptance into an amount of the price adjustment and/or a rate of the price adjustment.

In some embodiments, the above-mentioned method for estimating a transport service fee may be used not only in the real-time taxi-hailing scenarios, but also in a situation of the historical information of the existing payment records. For example, if the actual transport service fee is significantly different from the estimated transport service fee, the actual transport service fee may be used as a reference for a determination of cheating information.

Figure 11:
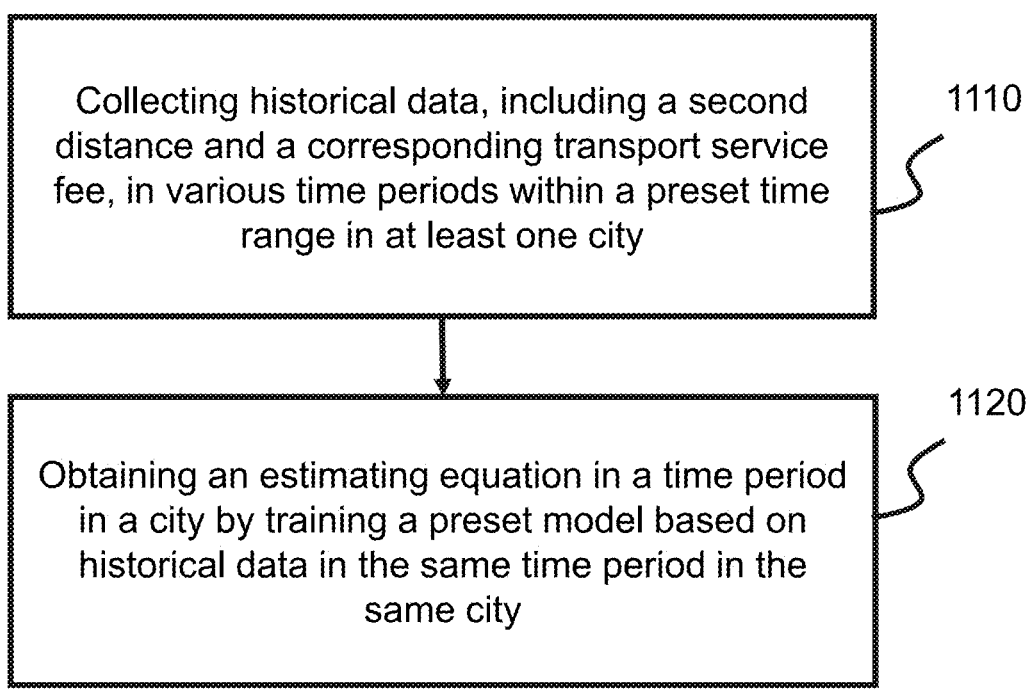
FIG. 11 is a flowchart of an exemplary process for generating an estimating equation according to some embodiments of the present disclosure.

FIG. 11 is a flowchart of an exemplary process 1100 for generating an estimating equation according to some embodiments of the present disclosure. As shown in FIG. 11, in step 1110, the server 110 (e.g., the acquisition module 310 of the server 110) may collect historical information for each time period within a preset time range in at least one city. The historical information may include a second distance and a corresponding real-time transport service fee. The second distance may be a spatial distance (such as a road distance or a water surface distance) for the vehicle (e.g., a vehicle, a ship, an aircraft, etc.) to travel from the starting location to the destination in the completed service request. If the preset time range is too long, too much historical information may be obtained, and the efficiency of the model training may be affected. However, if the preset time range is too short, historical information may not be enough and the accuracy of the estimating equation may be affected. For example, in order to keep a balance between accuracy and efficiency, the preset time range may be set to one month, that is, the historical information of each time period in at least one city in the last month is collected.

The historical information collected may involve a lot of noise. In order to avoid its negative influence on model training, the noise should be removed before the model training. The noise may include a case of incomplete payment (the second distance is long, but the real-time transport service fee is low, the passenger may pay part of the fee online and part of the fee offline), a case of cheating (the second distance is short, but the real-time transport service fee is high), outliers (different from the distribution of data points for most passengers), or the like.

Before executing step 1120, a preprocessing may be performed. The preprocessing may include any or a combination of: (1) estimating a starting price and corresponding mileage of the starting price; (2) removing historical information that is below the starting price; (3) removing cheating points; (4) removing outliers.

In some embodiments, the estimated starting price may be determined as follows: First, the starting price is defined as:

$$y\text{min}=\min[\text{top}x(\text{count}(yi))], \quad (1)$$

wherein the count (yi) denotes the number of the transport service fee of which the amount is equal to yi of historical information of the same city and the topx is the number of highest transport service fee in the historical information for the same time period and the same city. In some embodiments, the value of x may be from 5 to 30, for example, the value of x may be 20. It may be common that the transport service fee is the same as the starting price when hailing a taxi. Therefore, the number of different transport service fees in the historical information for the same city may be obtained and arranged in a descending order. The lowest transport service fee of the topx may be designated as the starting price. In some embodiments, the starting price determined by the above-mentioned method is not necessarily the lowest transport service fee of topx in large cities. For example, the starting price determined by above-mentioned method may be selected from top 10, top 5, top 3, or the like of the price arranged from low to high. A reasonable starting price may be obtained by considering multiple candidate sets and filtering them artifically.

In some embodiments, the estimated mileage of starting price may be determined as follows: obtaining historical information of the transport service fee of which the amount is equal to the previously determined starting price; ranking the second distance of the historical information from long to short, retaining only historical information of which the second distances are between 20% and 50% of the distribution of the second distances. The mileage of starting price determination may not be an exact number. For example, a range of mileages may be determined.

In some embodiments, the historical information below the starting price may be removed in following operations:

removing the historical information of the transport service fee of which the amount is below the starting price in the historical information of the same city directly. This historical information may correspond to a case of uncompleted payment.

In some embodiments, the cheating points may be removed in following operations. Historical information with the highest 20% transport service fee in the same city may be obtained. If the second distance of the historical information obtained is less than the average second distance of the historical information in the same city, and it is considered as a cheating point. In general, a short second distance may usually correspond to a low transport service fee.

In some embodiments, the outliers may be removed in following ways. the remaining isolated point may be removed by employing a method of detecting noise points of the historical information in the same city based on density-based spatial clustering of applications (with noise (DB-SCAN)). In DBSCAN, the historical information with a density exceeding a certain amount within a surrounding region may be a core point, and the historical information without the core point within a surrounding region may be a noise point. The noise point may be distributed far from most historical information which may affect the training effect of the preset model.

In step 1120, the transport service fee estimation unit 510 may train the preset model based on historical information of the same city and/or the same time period to obtain the estimating equations for the city and/or the time period.

In some embodiments, by taking into account the distribution of the historical information, the taxi fee rules and selecting the zeroth to fourth power of the second distance as chacrcteristic terms, the preset model may be defined as:

$$f(x) = w_4 x^4 + w_3 x^3 + w_2 x^2 + w_1 x + w_0, \quad (2)$$

wherein f(x) may denote the estimated transport service fee; $w_0$, $w_1$, $w_2$, $w_3$ and $w_4$ may denote constants; x may denote the second distance. Since there are multiple unknown constants (e.g., $w_0$, $w_1$, $w_2$, $w_3$ and $w_4$) in the preset model, the values of the constants may be obtained by training the preset model. By substuting the values of the constants into the preset model, the corresponding estimating equation may be obtained.

Considering that the tolerance of the transport service fee error is much greater than the tolerance of the transport service fee error rate, the loss function of minimized mean square error rate may be selected as an objective function when training model:

$$\min \sum \left( \frac{yi - f(xi)}{yi} \right)^2, \quad (3)$$

wherein (xi, yi) denotes the historical information, xi denotes the second distance of the i-th historical information, yi denotes the real-time transport service fee for the i-th historical information, and f (xi) denotes the estimated transport service fee. The closer the real-time transport service fee is to the estimated transport service fee, the smaller the objective function is. In some embodiments, a stochastic gradient descent (SGD) of general linear regression may be used to solve the function.

Figure 12:
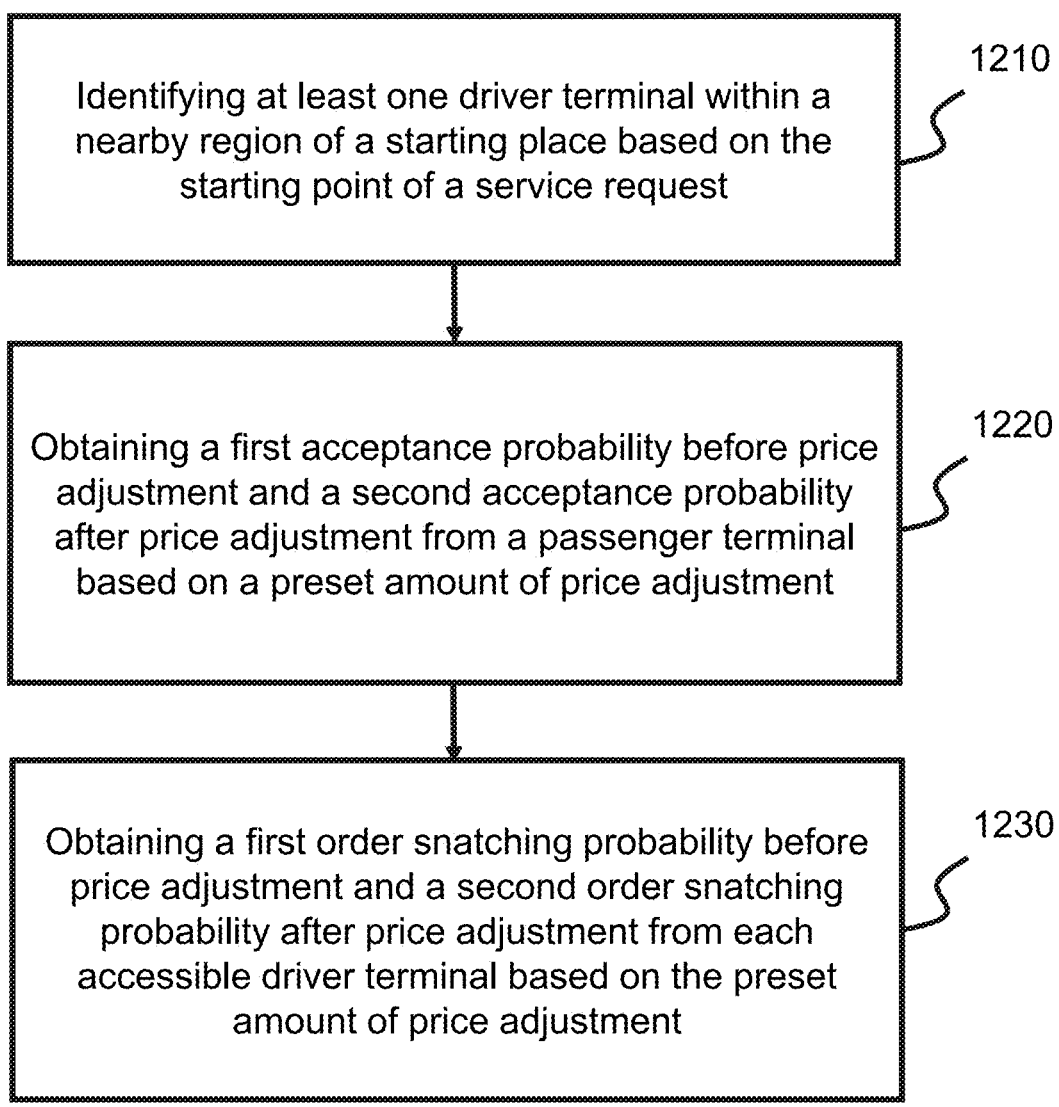
FIG. 12 is a flowchart of an exemplary process for obtaining a price adjustment condition according to some embodiments of the present disclosure.

Referring back to FIG. 10, step 1050 may be implemented by step 1200 of FIG. 12 for obtaining the price adjustment condition. In the present embodiment, the price adjustment condition may include the first acceptance probability of the passenger terminal 130 before the price adjustment, the second acceptance probability of the passenger terminal 130 after the price adjustment, the first order snatching probability of the driver terminal 140 before the price adjustment, and the second order snatching probability of the driver terminal 140 after the price adjustment.

As shown in FIG. 12, in step 1210, the server 110 (e.g., the acquisition module 310 of the server 110, or the terminal acquisition unit 420 in the acquisition module 310) may obtain at least one driver terminal 140 within a surrounding region of the starting point based on the starting point from the service request. The surrounding region of the starting point may be a region near the starting point, an administrative region that the starting point belongs to or a geographic region (e.g., the North China Plain, etc.) that the starting point belongs to. The surrounding region of the starting point may include a region within a certain distance threshold from the starting point. In some embodiments, the above-mentioned distance threshold may be determined by the system in consideration of factors, including the number of service requests, the starting point, the time, the road condition, the weather, or the like. In some embodiments, the distance threshold may be 0.5 km, 1 km, 2 km, 3 km, or the like. The administrative region that the starting point belongs to may include a city that the starting point belongs to, a district (e.g., Beijing Haidian District, etc.) that the starting point belongs to, a block that the starting point belongs to or a road that the starting point belongs to. In some embodiments, the administrative region that the starting point belongs to may be a city that the starting point belongs to. In some embodiments, the server 110 (e.g., the acquisition module 310 of the server 110, or the terminal acquisition unit 420 in the acquisition module 310) may obtain at least one driver terminal 140 within a preset distance from the starting point based on the starting point in the service request. The preset distance may be set by a user or automatically adjusted by the system based on the obtained driver terminal 140. For example, when the preset distance is 3 km, and the server 110 does not obtain any driver terminal 140, the preset distance may be increased to obtain at least one driver terminal 140.

In step 1220, the server 110 (e.g., the acquisition module 310 of the server 110, or the acceptance probability acquisition unit 430 of the acquisition module 310) may obtain a first acceptance probability before price adjustment and a second acceptance probability after price adjustment of the passenger terminal 130 based on the preset amount of the price adjustment. The first acceptance probability may correspond to a service fee before adjustment. The second acceptance probability may correspond to a service fee after adjustment. In some embodiments, the preset amount of the price adjustment may be (0, 100). If the amount is 0, it may be indicated that it is before price adjustment. If the amount is greater than 0, it may be indicated that it is after price adjustment. The first acceptance probability is a probability of the passenger terminal 130 that the service request is going to be completed before price adjustment (the amount of the price adjustment is 0), and the second acceptance probability is an acceptance probability of the passenger terminal 130 to the price adjustment request of the preset amount of the price adjustment. The acceptance probability acquisition unit 430 may predict a first acceptance probability and a second acceptance probability based on the historical service request data of the passenger terminal 130 and the preset amount of the price adjustment, using the pre-trained acceptance probability estimating model for price adjustment in the passenger terminal 130.

In some embodiments, the acceptance probability estimating model for price adjustment of the passenger terminal 130 may be obtained by the following steps: (1) obtaining the historical service request data of the passenger terminal 130 within a preset period of time; (2) taking the obtained historical service request data as training data and training the acceptance probability estimating model for price adjustment of the passenger terminal by the training data. The historical service request data may include the number of historical service requests of the passenger terminal 130, the number of completed historical service request, methods of price reduction (e.g., cash coupons, red packets or the like), the amount of reduced price (e.g., the amount of used cash coupons, the amount of the remaining cash coupons, the amount of used red packets, the amount of remaining red packets, etc.), the amount of price adjustment corresponding to each historical service request, or the like, or any combination thereof. In some embodiments, the training of the acceptance probability estimating model may be performed based on a linear regression model or the like. In some embodiments, the linear regression model may include a logistic regression, a support vector machine, or the like.

In some embodiments, the server 110 (e.g., the processing module 320 of the server 110, or the transport service fee estimation unit 510 in the processing module 320) may be trained using a logistic regression model to obtain the acceptance probability estimating model for price adjustment of the passenger terminal 130. The logistic regression model may be expressed as follows:

$$\begin{cases} Pr(y=1 \mid x, w) = \dfrac{1}{1+e^{-w^T x}} \\ Pr(y=0 \mid x, w) = \dfrac{e^{-w^T x}}{1+e^{-w^T x}} \end{cases} \quad (4)$$

wherein x denotes multi-dimensional characteristic data, that is historical order data of the passenger terminal 130; y may represent an objective variable. y=1 may indicate that the prediction is accepted and y=0 may indicate that the prediction is not accepted; Pr (y=X, w) may represent the probability of accepting the price adjustment, and Pr (y=0|x, w) may indicate the probability that the price adjustment is not accepted.

In step 1230, from each obtained driver terminal 140, the server 110 (e.g., the acquisition module 310 in the server 110, or the order snatching probability acquisition unit 440 in the acquisition module 310) may be configured to obtain a first order snatching probability before the price adjustment and a second order snatching probability after the price adjustment based on the preset amount of price adjustment. The first order snatching probability may be the order snatching probability of the driver terminal 140 before the price adjustment (the amount of the price adjustment is 0). The second order snatching probability may be the order snatching probability of the driver terminal 140 after the price adjustment. The server 110 may predict the first order snatching probability and the second order snatching probability based on the historical service data of the driver terminal 140, the preset amount of the price adjustment and the pre-trained order snatching estimating model for price adjustment of the driver terminal 140.

In some embodiments, the order snatching probability estimating model for price adjustment of the driver terminal 140 may be obtained by the following steps: (1) obtaining the historical service request data of the driver terminal 140 within a preset period of time; (2) taking the obtained historical service request data as the training data and training the order snatching probability estimating model for price adjustment of the driver terminal 140 by the training data. The historical service data may include the historical order snatching probability of the driver terminal 140, the average online time of the driver terminal 140, the amount of the price adjustment for each historical service, or the like. In some embodiments, order snatching probability estimating model may be trained based on a linear regression model or the like. In some embodiments, the linear regression model may be a logistic regression model, a support vector machine model, or the like.

In some embodiments, the server 110 (e.g., the processing module 320 of the server 110, or the transport service fee estimation unit 510 in the processing module 320) may train the order snatching estimating model for price adjustment of the driver terminal 140 using a logistic regression model. In some embodiments, the logistic regression model may be expressed as formula (4).

In some embodiments, after step 1230, the following steps may be performed: (1) determining the value of α'β'-αβ based on the obtained first acceptance probability α of the passenger terminal 130 before the price adjustment, the obtained second acceptance probability α' of the passenger terminal 130 after the price adjustment, the obtained first order snatching probability β of the driver terminal 140 before the price adjustment and the obtained second order snatching probability β' of the driver terminal 140 after the price adjustment; (2) determining whether the value of α'β'-αβ is greater than 0, and if the value of α'β'-αβ is greater than 0, a price adjustment request may be transmitted to the passenger terminal 130 based on the preset amount of the price adjustment; (3) determining whether the response information transmitted by the passenger terminal 130 for the price adjustment request has been received within the preset period of time. If the response message is not received or a response message refusing to increase the payment is received r, the service request may be discarded. If a response message accepting the increase of the payment is received, a service request may be generated and transmitted to the plurality of driver terminals 140. In some embodiments, the price adjustment request may include information that prompts for an increase in the amount of payment or information that prompts for an increase in rates of the payment.

Referring back to FIG. 10, step 1050 and step 1060 may be implemented by the method 1300 for determining whether to make a price adjustment as shown in FIG. 13. As shown in FIG. 13, in step 1310, the server 110 (e.g., the processing module 320 of the server 110, or the price adjustment determination unit 520 in the processing module 320) may compare the number of service requests in a region that the service requests are transmitted from within a first preset time period with the number of available online driver terminals within the first preset time period. For example, the number of service requests from the airport within 10 minutes (the first preset time period) is 80, and the number of available online driver terminals 140 within 10 minutes (the first preset time period) is 65. In some embodiments, the server 110 (e.g., the acquisition module 310 of the server 110, or the service request acquisition unit 410 in the acquisition module 310) may obtain the number of service requests within a preset distance from the starting point based on the starting point of the service requests. The preset distance may be set by the user (e.g., 1-5 km) or be automatically adjusted by the system based on the obtained service request. A current time period may be a preset time period including the current time. The preset time period may be set by the user (e.g., 10 minutes, etc.) or be automatically adjusted by the system based on the obtained service request. For example, if the preset time is 10 minutes, and the system cannot obtain any service request, the preset time may be increased to obtain at least one service request. In some embodiments, the length of the preset time may be determined by the server 110 in consideration of factors, including current time, the number of the service requests, the number of available online driver terminals, road condition, weather, or the like. In some embodiments, the server 110 (e.g., the acquisition module 310 of the server 110, or the service request acquisition unit 410 in the acquisition module 310) may obtain a service request transmitted within a preset time period, especially before or after the current time. In some embodiments, the server 110 (e.g., the acquisition module 310 of the server 110, or the terminal acquisition unit 420 in the acquisition module 310) may obtain the number of the current available online driver terminals 140 within a preset distance from the starting point based on the starting point of the service request. In some embodiments, the server 110 may obtain the number of the driver terminals within a preset distance. The preset distance of the driver terminals obtained may correspond to the preset distance of the service request. For example, the preset distance of the service request may be 3 km, the server 110 may obtain the number of the driver terminals 140 within 3 km.

In step 1320, if the number of the service requests is greater than the number of the driver terminals 140, the server 110 (e.g., the processing module 320 of the server 110, or the price determination unit 520 in the processing module 320) may determine that a strategy of price adjustment may be applied to the current service requests. If the number of the service requests is less than or equal to the number of the driver terminals 140, an oversupply or a supply-demand balance may be indicated, the server 110 (e.g., the processing module 320 of the server 110, or the price determination unit 520 in the processing module 320) may determine that the strategy of the price adjustment may not be applied to the current service requests.

In some embodiments, after step 1320, the following steps may be performed. (1) If the number of the service requests is greater than the number of the driver terminals 140, the server 110 (e.g., the feedback module 330 of the server 110, or the price adjustment request transmitting unit 620 in the feedback module 330) may transmit a price adjustment request to the passenger terminal 130 based on the preset amount of the price adjustment; (2) determining whether the response information transmitted by the passenger terminal 130 for the price adjustment request has been received within the preset period of time. If the response message is not received or a response message refusing to increase the payment, the service request may be discarded. If a response message accepting the increase of the payment is received, a service request may be generated and transmitted to the plurality of driver terminals 140. In some embodiments, the price adjustment request may include information that prompts for an increase in the amount of payment or information that prompts for an increase in rate of the payment.

Referring back to FIG. 13, step 1320 may be implemented by the method 1400 for determining whether to make a price adjustment as shown in FIG. 14. As shown in FIG. 14, in step 1410, if the number of service requests m in a region that the service requests are transmitted from within a first preset time period is greater than the number of the current available online driver terminals 140 n, the server 110 (e.g., the processing module 320 of the server 110, or the price adjustment determination unit 520 in the processing module 320) may obtain a unit price of the m service requests. The m service requests may include current service requests from the passenger terminal 130. The n driver terminals 140 may be the current available online driver terminals 140 in a region that the current service requests are transmitted from. The unit price of the service requests may be a value of the service request within a unit distance.

In some embodiments, the unit price of them service requests may be obtained as follows: for each service request, (1) obtaining a distance $S_{order}$ between the destination and the starting point in the service request; (2) obtaining the average order receiving distance $S_{avg}$ between the n driver terminals 140 and the starting point in the service request; (3) obtaining the estimated price F of the service request based on the destination and the starting point of the service request (The estimated price may be obtained by multiplying the distance $S_{orde}$ between the destination and the starting point in the service request by the price of the unit distance); (4) the unit price of the service request may be calculated according to the following formula:

$$P = \frac{F}{S_{order} + S_{avg}}, \tag{5}$$

wherein P denotes the unit price of the service request.

In step 1420, the server 110 (e.g., the processing module 320 of the server 110, or the price determination unit 520 in the processing module 320) may rank the unit prices of the m service requests from high to low and obtain the ranking of the current transmitting service requests r. Sorting algorithm may include a bubble sort, a cocktail sort, an insert sort, a bucket sort, a counting sort, a merge sort, an in-place merge sort, a binary tree sort, a pigeon sort, a radix sort, a Gnome sort, a library sort, a selection sort, a Shell sort, a combined sort, a heap sort, a smooth sort, a quick sort, or the like, or any combination thereof.

In step 1430, if r is greater than m-n, the server 110 (e.g., the processing module 320 of the server 110, or the price adjustment determination unit 520 in the processing module 320) may determine that a price adjustment strategy may be applied to the current service requests. In some embodiments, the price adjustment strategy is to transmit a price adjustment request to the service requests at lower rankings. The lower the ranking is, the higher the amount of the price adjustment is. In some embodiments, the price adjustment request may include information that prompts for an increase in the amount of payment or information that prompts for an increase in rate of the payment.

Figure 15:
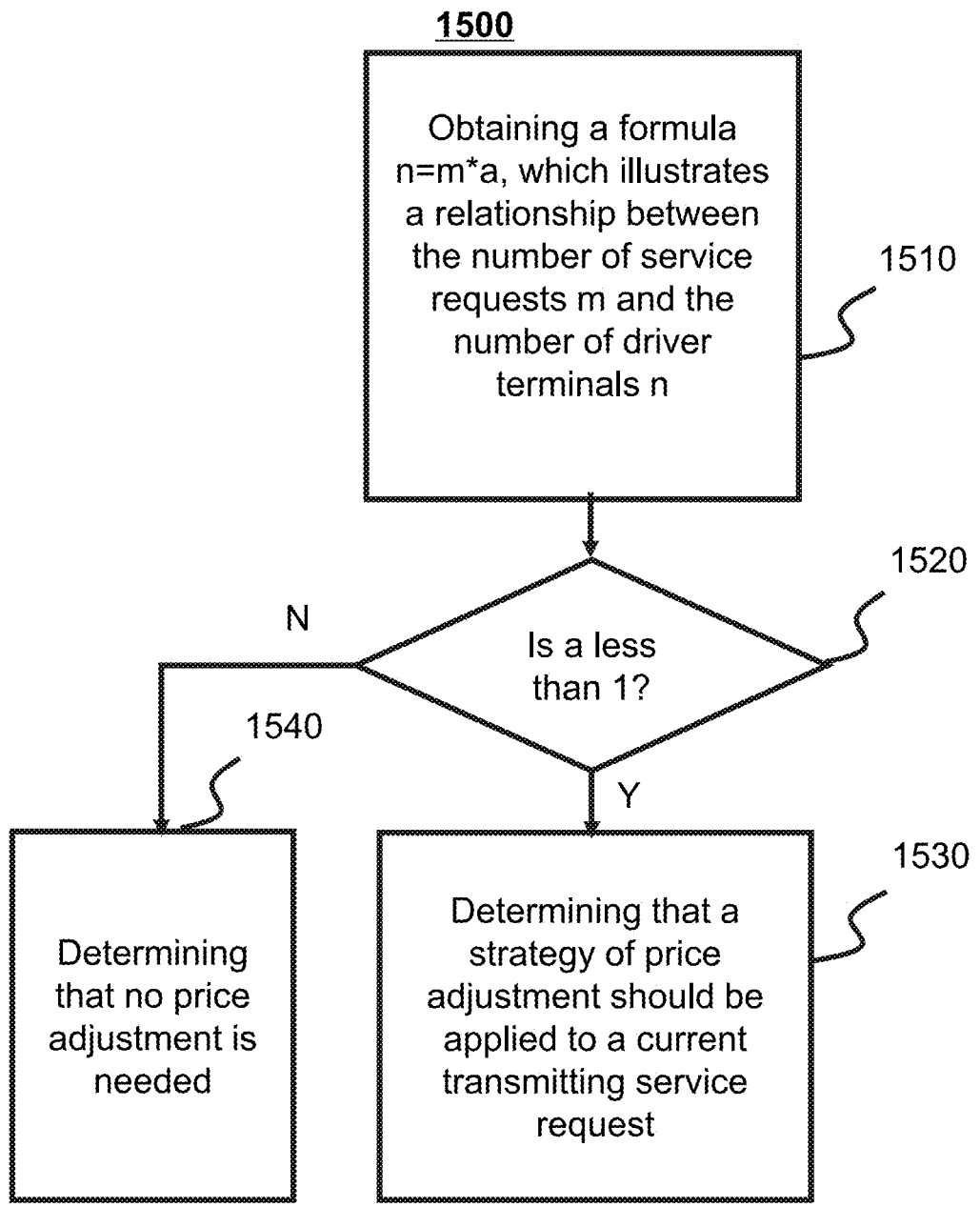
FIG. 15 is a flowchart of an exemplary process for determining whether to make a price adjustment according to some embodiments of the present disclosure.

Referring back to FIG. 13, step 1320 may be implemented by a method 1500 as shown in FIG. 15 for determining whether to make a price adjustment. As shown in FIG. 15, in step 1510, the server 110 (e.g., the acquisition module 310 of the server 110, or the service request acquisition unit 410 in the acquisition module 310) may obtain a formula n=m*a, illustrating a relationship between the number of service requests m and the number of driver terminals n. The parameter a may be greater than 0.

In step 1520, the server 110 (e.g., the processing module 310 of the server 110, or the price adjustment determination unit 520 in the processing module 310) may determine whether \a is less than 1. If a is less than 1, the price adjustment strategy is determined to be applied to the current service requests (step 1530); otherwise, no price adjustment is determined to be made (step 1540). The value of a may reflect a supply-demand relationship, if a is less than 1, it may be indicated that the number of service requests in the region is greater than the number of driver terminals 140, i.e., it is in short supply, a price adjustment strategy may be applied at this moment. In some embodiments, the price adjustment strategy is to transmit a price adjustment request to the passenger terminal 130 which transmits the service requests. In some embodiments, the price adjustment request may include information that prompts for an increase in the amount of payment or information that prompts for an increase in rate of the payment. Moreover, a smaller a may indicate that a greater difference between the number of service requests in the region and the number of driver terminals 140, and a greater amount of the price adjustment. In some embodiments, the amount of the price adjustment may be determined according to the following formula:

$$F_p = \frac{b}{a}, \qquad (6)$$

wherein $F_p$ denotes the fare increase amount of the service request, and b denotes the preset amount.

Figure 16:
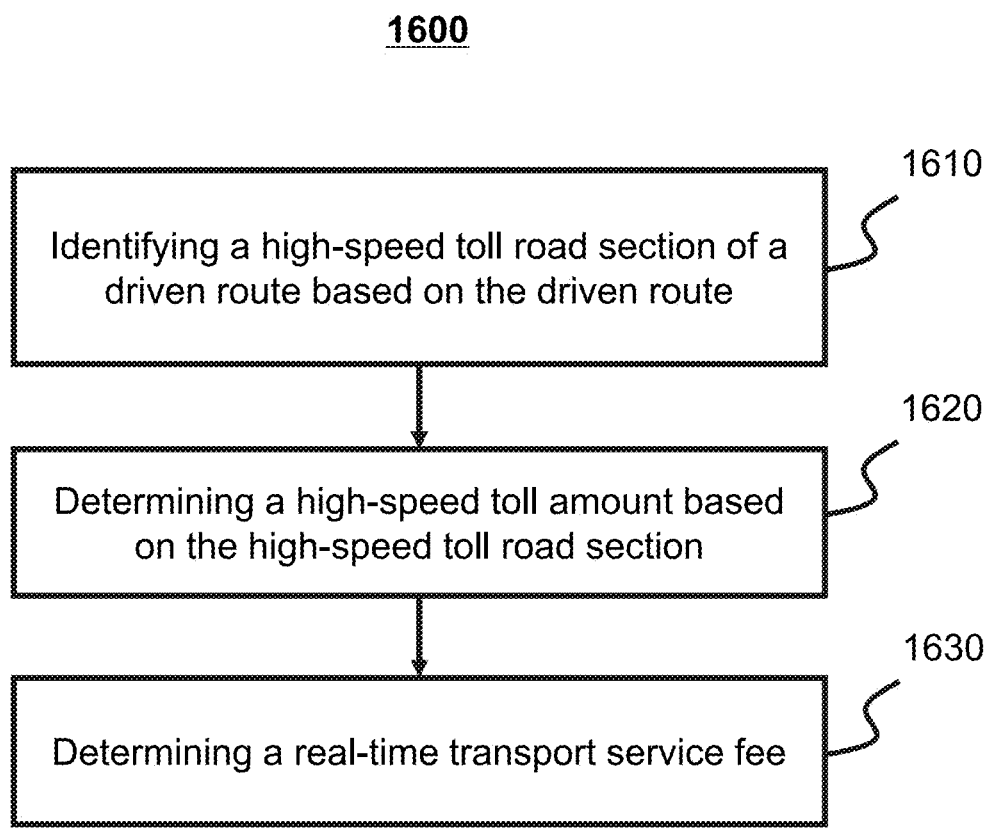
FIG. 16 is a flowchart of an exemplary process for determining a real-time transport service fee according to some embodiments of the present disclosure.

Referring back to FIG. 9, step 920 may be implemented by the method 1600 for determining a real-time transport service fee as shown in FIG. 16. In some embodiments, the server 110 (e.g., the processing module 320 of the server 110) may determine a generated real-time transport service fee based on the driven route. In some embodiments, the driven route may include a driven toll-free road section, a driven toll road section, or a combination thereof. In some embodiments, the toll road section may be any road section on which a toll is charged. An exemplary toll road section may include a toll road section (e.g., a high-speed road section, a private road section, a congested road section, etc.), a toll bridge section, a toll tunnel section, a toll channel section, or the like, or any combination thereof. As shown in FIG. 16, a high-speed toll road section is taken as an example of toll road section in the process 1600 for determining a real-time transport service fee.

As shown in FIG. 16, in step 1610, the server 110 (e.g., the processing module 320 of the server 110, or the high-speed toll road section determination unit 560 in the processing module 320) may determine a high-speed toll road section included in the driven route based on the driven route.

At step 1620, the server 110 (e.g., the processing module 320 of the server 110, or the high-speed toll amount determination unit 570 in the processing module 320) may determine a high-speed toll amount based on the high-speed toll road section determined by step 1610. In some embodiments, the determination of the high-speed toll amount may be performed baesd on the type of vehicle, the length of the toll road section, the running time of corresponding road section, the number of times that the vehicle passes through the road section, current situation of the road section, or the like, or any combination thereof. In some embodiments, the type of vehicle may include a large automobile, a compact car, a special purpose vehicle (e.g., an environmental clean vehicle, a mail car, a tractor, a truck crane, a fire fighting truck, an ambulance, a recovery vehicle, a police car, etc.), an electric car (e.g., a tramcar, a trolley bus, etc.), a motorcycle (a three-wheeled motor vehicle, a two-wheeled motor vehicle, a solo machine, etc.), or the like. The type of large automobile and/or the compact car may be determined by the following parameters. The parameters may include vehicle weight (e.g., vehicle net weight, total weight after loading, bearable loading weight, etc.), vehicle dimensions (e.g., vehicle length, vehicle width, vehicle height, etc.), or the like, or any combination thereof. In some embodiments, the types of the vehicles may be divided based on fuel. For example, the vehicle may include a diesel vehicle, a gasoline vehicle, a fuel gas vehicle, an electric vehicle, a hydrogen fuel vehicle, a hybrid energy vehicle, or the like. In some embodiments, current situation of the road section may include a congested road section (a slight congested road section, a heavy congested road section, etc.), a clear lap, or the like.

In step 1630, the server 110 (e.g., the processing module 320 of the server 110) may determine a real-time transport service fee of the vehicle. In some embodiments, the server 110 (e.g., the processing module 320 of the server 110) may determine a real-time transport service fee based on a high-speed toll amount and a basic mileage fee of the vehicle. In some embodiments, the basic mileage fee of the vehicle may be a transport service fee determined by mileages of the driven route.

In some embodiments, the server 110 (e.g., the feedback module 330 of the server 110, or the fee display unit 670 in the feedback module 330) may generate a determined real-time transport service fee, a high-speed toll road section fee, a basic mileage fee, or the like, or any combination thereof of the vehicle. In some embodiments, the server 110 (e.g., the processing module 320 of the server 110, or the real-time transport service fee transmitting unit 630 in the processing module 320) may transmit the determined real-time transport service fee, the high-speed toll road section fee, the basic mileage fee, or the like, or any combination thereof, of the vehicle to the passenger terminal 130 and/or the driver terminal 140.

Figure 17:
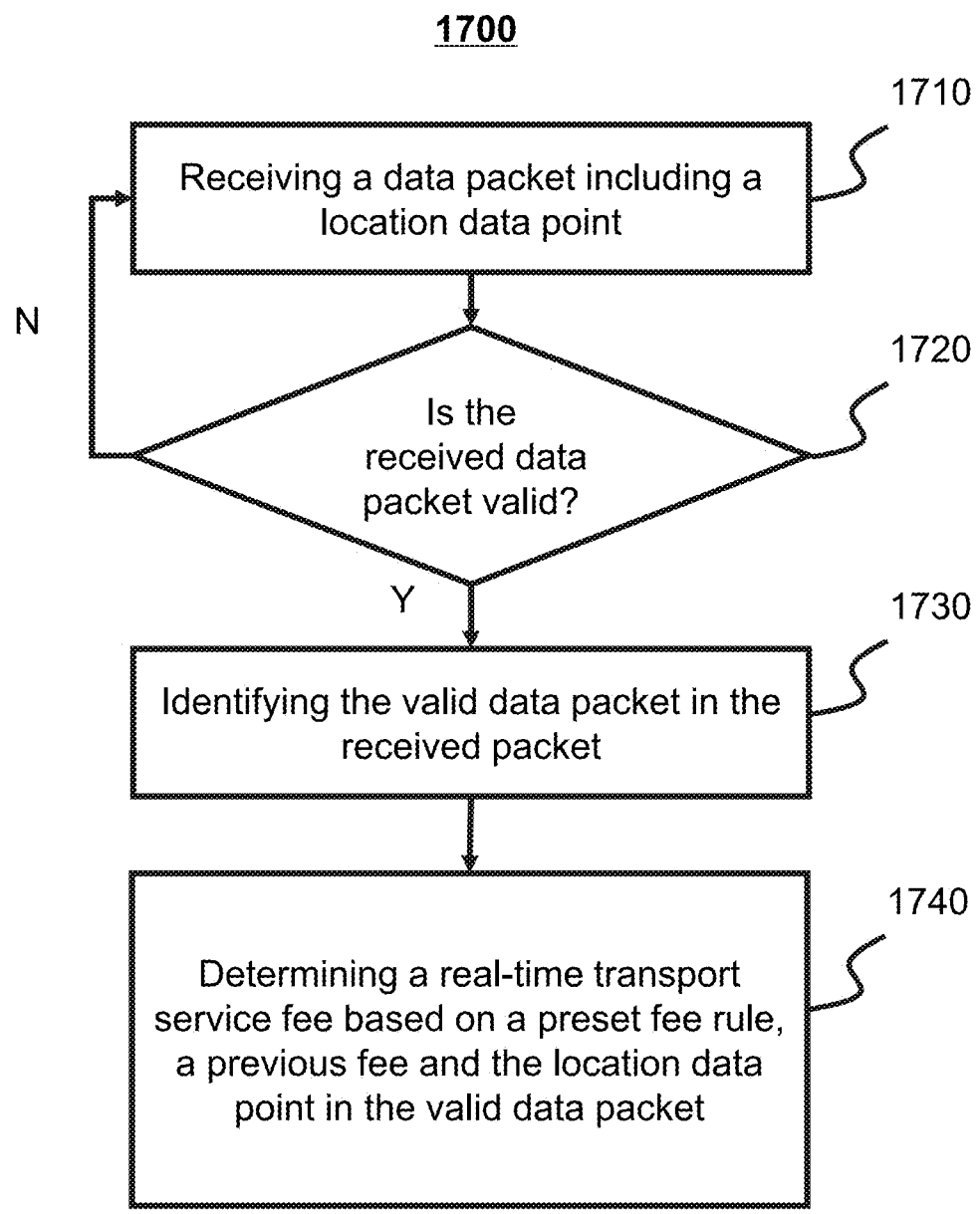
FIG. 17 is a flowchart of an exemplary process for determining a real-time transport service fee according to some embodiments of the present disclosure.

Referring back to FIG. 9, step 920 may be implemented by the method 1700 for determining a real-time transport service fee as shown in FIG. 17. In some embodiments, the server 110 (e.g., the processing module 320 of the server 110) may determine a real-time transport service fee based on the location data points.

As shown in FIG. 17, in step 1710, the server 110 (e.g., the acquisition module 310 of the server 110, or the data packet receiving unit 450 in the acquisition module 310) may receive a data packet including location data point transmitted by the driver terminal 140 and/or the passenger terminal 130. In some embodiments, the server 110 (e.g., the acquisition module 310 of the server 110, or the data packet receiving unit 450 in the acquisition module 310) may receive a data packet including a preset number of location data points. In some embodiments, the preset number of location data points may be a certain number or a certain number range of data points determined by the interaction between the driver terminal 140 and/or the passenger terminal 130 and the server 110. For example, the number of data points transmitted by the driver terminal 140 and/or the passenger terminal 130 received by the server 110 (e.g., the acquisition module 310 of the server 110, or the data packet receiving unit 450 in the acquisition module 310), may be 0-20, 0-5, 5-10, 10-15 or 15-20, 5, 10, 15 or 20. In some embodiments, the preset number of location data points may be a number of data points determined by the interaction between the driver terminal 140 and/or the passenger terminal 130 and the server 110 that are received by the server 110 (e.g., the acquisition module 310 of the server 110, or the data packet receiving unit 450 in the acquisition module 310) within a certain period of time based on a speed for generating the location data points and an upload cycle. For example, the driver terminal 140 and/or the passenger terminal 130 may generate a location data point every second, and may take 10 seconds as the upload cycle. The driver terminal 140 and/or the passenger terminal 130 uploads a data packet to the data packet receiving unit 450 every 10 seconds, and each data packet includes 10 location data points. In some embodiments, the location data points may include the information such as a coordinate, a time at which the position coordinate is obtained, a speed vector at that time, or the like, or any combination thereof. In some embodiments, the coordinate may be a set of data values for determining a position relationship (e.g., X-axis coordinate, Y-axis coordinate and Z-axis coordinate or longitude, latitude and height, etc.).

In step 1720, the server 110 (e.g., the processing module 320 of the server 110, or the data packet processing unit 530 in the processing module 320) may determine whether the data packet received by the data packet receiving unit 450 is valid. In some embodiments, the method for determining whether the received data packet is valid may include obtaining a first time stamp corresponding to the first location data point in the received data packet; obtaining a second time stamp corresponding to the last location data point in the previously received data packet; determining a sequence of the first time stamp and the second time stamp, if the first time stamp is later than the second time stamp, the received data packet is determined valid; otherwise, the received data packet is determined invalid. In some embodiments, if the server 110 (e.g., the processing module 320 of the server 110, or the data packet processing unit 530 in the processing module 320) determines that the received data packet is valid, step 1730 may be performed. In some embodiments, if the server 110 (e.g., the processing module 320 of the server 110, or the data packet processing unit 530 in the processing module 320) determines that the received data packet is invalid, the data packet may be discarded and step 1710 may performed.

In step 1730, the server 110 (e.g., the processing module 320 of the server 110, or the data packet processing unit 530 in the processing module 320) may determine a valid data packet from the received data packets. The valid data packet includes the location data points.

In step 1740, the server 110 (e.g., the processing module 320 of the server 110, or the data packet processing unit 530 in the processing module 320) may determine a real-time transport service fee based on the preset fee rule, the previous fee and the location data point of the valid data packet. In some embodiments, the server 110 (e.g., the processing module 320 of the server 110, or the data packet processing unit 530 in the processing module 320) may determine a transport service fee in the received data packet based on the preset fee rule and the valid data packet including location data point. The real-time transport service fee may be the sum of the previous fee and the transport service fee in the received data packet. The previous fee may be a transport service fee before the server 110 (e.g., the processing module 320 of the server 110, or the data packet processing unit 530 in the processing module 320) performs step 1710 for receiving a data packet. In some embodiments, the preset fee rule may be calculated using a unit pricing method, a segmented pricing method, determined artificially, or determined based on specific application scenarios. In some embodiments, the preset fee rule may be an algorithm, a formula, a rule, a method, a process, or the like, or any combination thereof.

In some embodiments, the method for determining a real-time transport service fee in step 1740 may also include determining a fee included in the currently received data packet based on a distance sum and determining real-time transport service fee based on the distance, and the following steps may be included. The server 110 (e.g., the processing module 320 of the server 110, or the data packet processing unit 530 in the processing module 320) may add the last location data point in the previously received data packet to the currently received data packet; determine a distance between each two adjacent location data points in the currently received data packet; determine a certain number of location data points and a sum of distances between the positions of the obtained location points based on the distance between each two adjacent location data points; determine a fee included in the currently received data packet based on the preset fee rule and the determined sum of distances between a certain number of positions; and determine a real-time transport service fee based on the previous fee and the fee included in the currently received data packet. For convenience, the upload cycle is 10 seconds, and one location data point (each location data point includes information of a position) is generated per second. In an example thatng each data packet includes 10 location data points, a method for determining the real-time transport service fee may include that after the server 110 (e.g., the acquisition module 310 of the server 110, or the data packet receiving unit 450 in the acquisition module 310) has received a valid data packet, the server 110 (e.g., the processing module 320 of the server 110, or the data packet processing unit 530 in the processing module 320) may add the last location data point in the previously received data packet to the currently received data packet. The currently received data packet may include 11 location data points corresponding to 11 positions. A distance between each two adjacent positions of the 11 positions may be determined and hence 10 distances may be obtained. A distance sum is obtained by adding up the distances. A fee included in the currently received data packet may be determined based on the preset fee rule and the above-mentioned distance sum; and a real-time transport service fee is determined by adding up the fee included in the currently received data packet and the previous fee.

In some embodiments, the process 1700 for determining a real-time transport service fee may also include the following steps: the server 110 (e.g., the processing module 320 of the server 110, or the data packet processing unit 530 in the processing module 320) may record the last location data point in the currently received data packet, the second time stamp corresponding to the last location data point and the real-time transport service fee; and may discard the currently received data packet.

In some embodiments, the server 110 (e.g., the feedback module 330 of the server 110, or the real-time transport service fee transmitting unit 630 in the feedback module 330) may transmit a real-time transport service fee determined by the server 110 (e.g., the processing module 320 of the server 110, or the data packet processing unit 530 in the processing module 320) to the driver terminal 140 and/or the passenger terminal 130. In some embodiments, the server 110 (e.g., the feedback module 330 of the server 110, or the fee display unit 670 in the feedback module 330) may generate a display in a certain format based on the determined real-time transport service fee.

Figure 18:
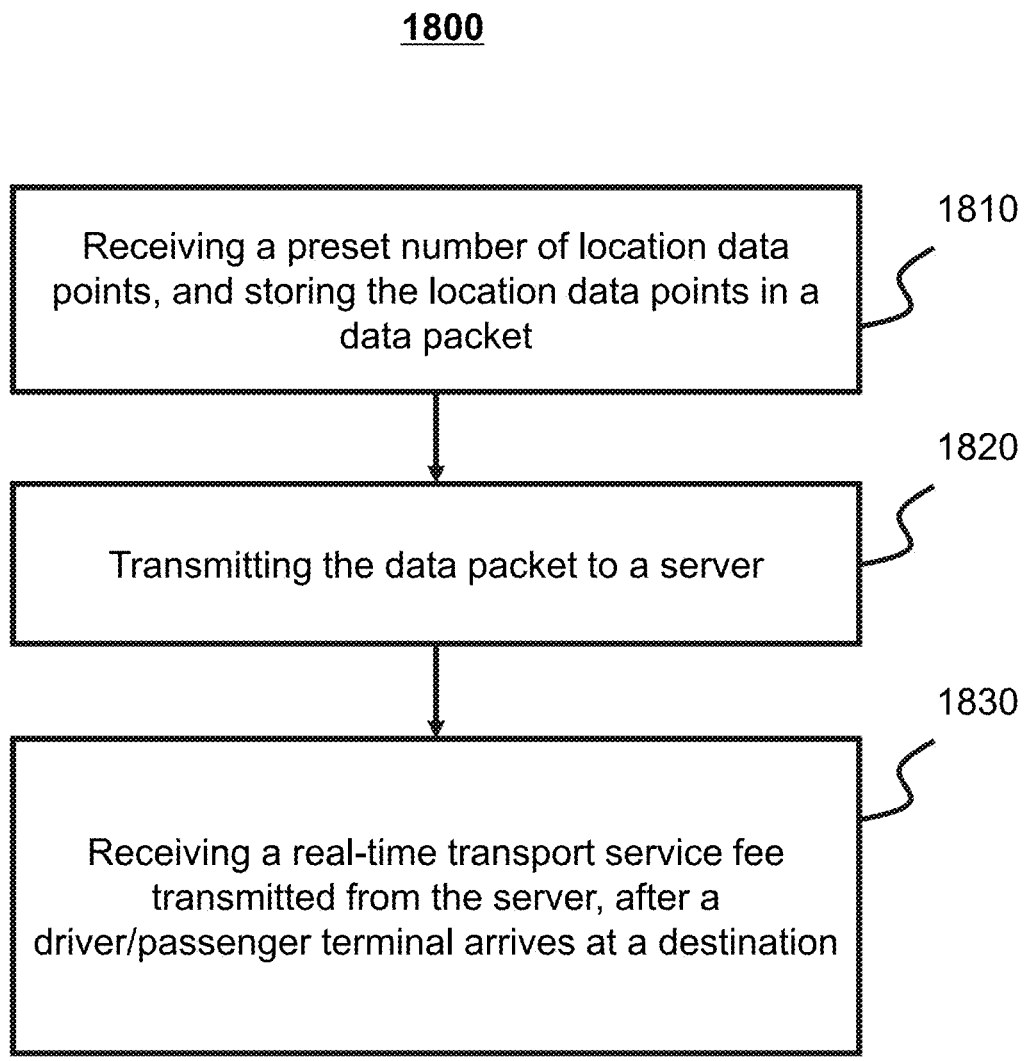
FIG. 18 is a flowchart of an exemplary process for determining a real-time transport service fee according to some embodiments of the present disclosure.

Referring back to FIG. 9, step 920 may be implemented by the method 1800 for determining a real-time transport service fee as shown in FIG. 18. In some embodiments, the process 1800 may be a method for determining a real-time transport service fee jointly by the passenger terminal 130 and/or the driver terminal 140 and the server 110 as shown in FIG. 7.

As shown in FIG. 18, in step 1810, the passenger terminal 130 and/or the driver terminal 140 (e.g., the data point acquisition unit 712 of the passenger terminal 130 and/or the driver terminal 140) may obtain a preset number of location data points. The passenger terminal 130 and/or the driver terminal 140 (e.g., the data point storage unit 732 of the passenger terminal 130 and/or the driver terminal 140) may store the preset number of location data points in a data packet. In some embodiments, the preset number of location data points obtained by the passenger terminal 130 and/or the driver terminal 140 (e.g., the data point acquisition unit 712 of the passenger terminal 130 and/or the driver terminal 140) may be a certain number or a certain number range of data points determined by the interaction between the driver terminal 140 and/or the passenger terminal 130 and the server 110. For example, the number of data points obtained by the passenger terminal 130 and/or the driver terminal 140 (e.g., the data point acquisition unit 712 of the passenger terminal 130 and/or the driver terminal 140) may be 0-20, 0-5, 5-10, 10-15, 15-20, 5, 10, 15 or 20. In some embodiments, the preset number of data packets may be the number of data points determined by the interaction between the driver terminal 140 and/or the passenger terminal 130 and the server 110 and may be obtained by the server 110 (e.g., the unit 712 of the driver terminal 140 and/or the passenger terminal 130) within a certain period of time based on a speed for generating the location data points and an upload cycle. For example, the driver terminal 140 and/or the passenger terminal 130 may generate a location data point in every second. The driver terminal 140 and/or the passenger terminal 130 may upload the location data points generated in the last 10 seconds to the server 110 every 10 seconds via the network 120. The passenger terminal 130 and/or the driver terminal 140 (e.g., the data point acquisition unit 712 of the passenger terminal 130 and/or the driver terminal 140) may obtain 10 location data points every 10 seconds. In some embodiments, the passenger terminal 130 and/or the driver terminal 140 (e.g., the data point storage unit 732 of the passenger terminal 130 and/or the driver terminal 140) may store the 10 obtained location data points in a data packet. Each data packet includes 10 location data points.

In step 1820, the passenger terminal 130 and/or the driver terminal 140 (e.g., the data packet transmitting unit 722 of the passenger terminal 130 and/or the driver terminal 140) may transmit the data packet to the server 110. In some embodiments, the server 110 may determine a real-time transport service fee based on the data packet transmitted by the passenger terminal 130 and/or the driver terminal 140 (e.g., the data packet transmitting unit 722 of the passenger terminal 130 and/or the driver terminal 140). In some embodiments, the server 110 may determine a real-time transport service fee according to the method 1700 as shown in FIG. 17 of the present disclosure.

In step 1830, after the driver terminal 140 and/or the passenger terminal 130 arrives at the destination, the driver terminal 140 and/or the passenger terminal 130 (e.g., the fee receiving unit 714 of the passenger terminal 130 and/or the driver terminal 140) may receive a real-time transport service fee transmitted by the server 110.

Figure 19:
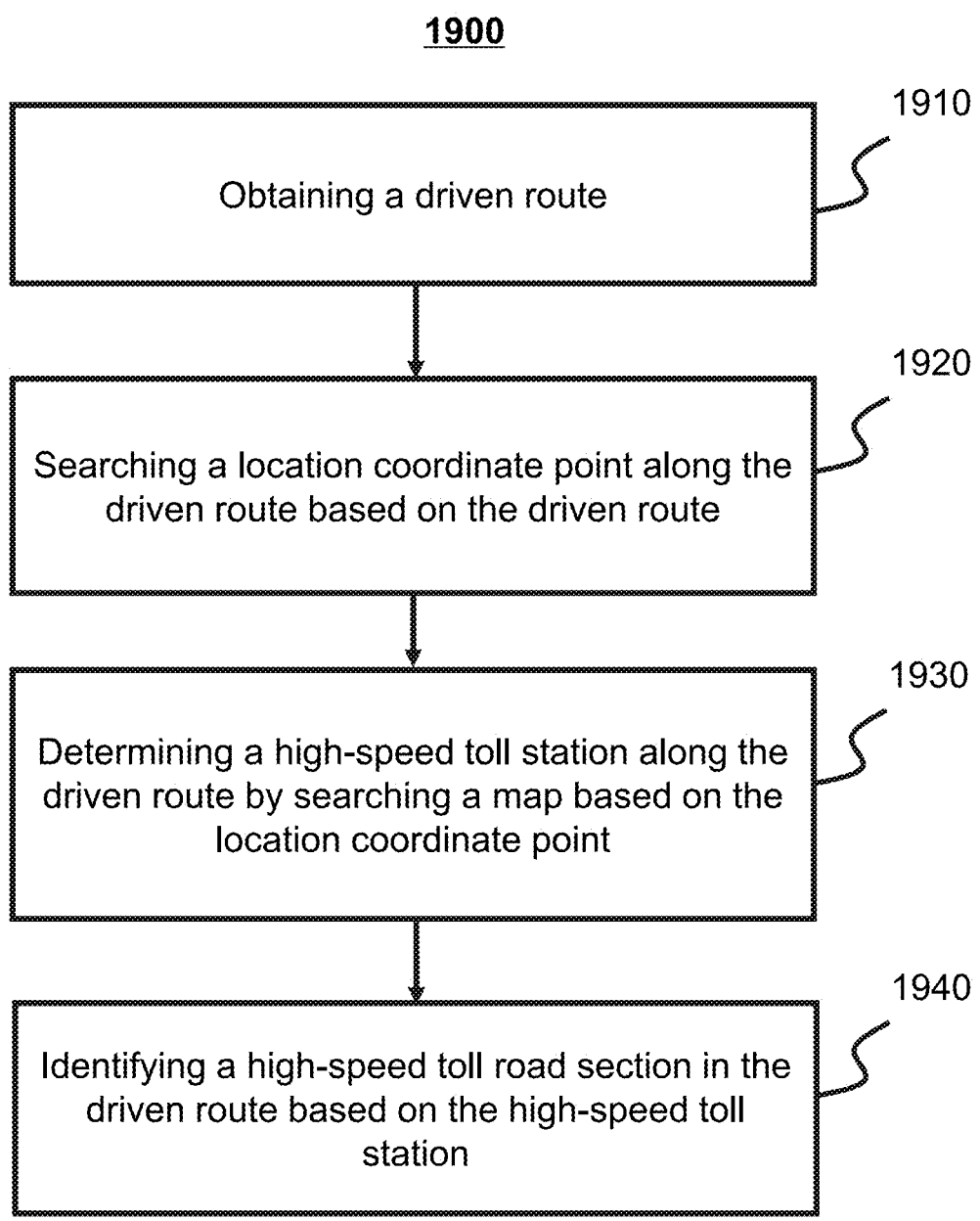
FIG. 19 is a flowchart of an exemplary process for determining a high-speed toll road section according to some embodiments of the present disclosure.

Referring back to FIG. 16, step 1610 may be implemented by the method 1900 for determining a high-speed toll road section as shown in FIG. 19. As shown in FIG. 19, in step 1910, the server 110 may obtain a driven route. In some embodiments, the server 110 may determine a currently driven route based on the location coordinate point of the destination in the service request and the location coordinate point of the current position.

In step 1920, the server 110 may query a location coordinate point along the driven route based on the driven route. In some embodiments, the system may obtain a location data point in real time when the vehicle is moving. In some embodiments, the server 110 may obtain a location data packet from the passenger terminal 130 at a preset time interval (e.g., 10 seconds).

In step 1930, the server 110 may query a map based on the location coordinate point to determine a high-speed toll station along the driven route. In some embodiments, the map is in a map library. The map library may be a map library within the server 110, or a map library from a third party. The map library from the third party may include Baidu Map, Amap, Sogou Map, QQ Map, Apple Map, Google Maps, Bing Map, Careland Map, or the like, or any combination thereof. In step 1940, the server 110 may determine a high-speed toll road section among the currently driven route based on the high-speed toll station.

Figure 20:
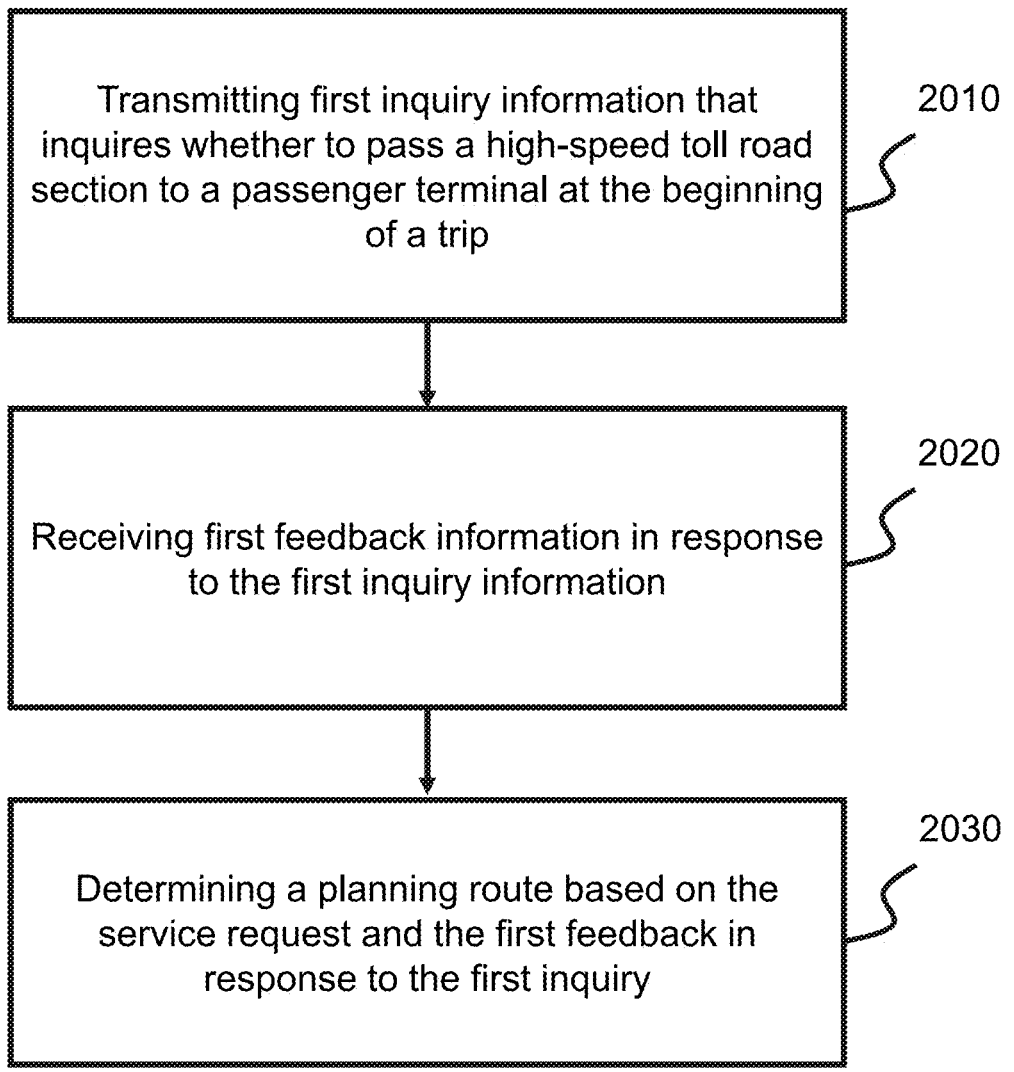
FIG. 20 is a flowchart of an exemplary process for determining a planning route according to some embodiments of the present disclosure.

FIG. 20 is a flowchart of an exemplary process 2000 for determining a planning route according to some embodiments of the present disclosure. In step 2010, the second information transmitting unit 650 may transmit first inquiry information inquiring whether to enter high-speed toll road sections to the passenger terminal 130 at the beginning of a trip.

In step 2020, the server 110 (e.g., the feedback module 330 of the server 110, or the information receiving unit 660 in the feedback module 330) may receive first feedback information of the passenger terminal 130 in response to the first inquiry information.

In step 2030, the server 110 (e.g., the processing module 320 of the server 110, or the route planning determination unit 540 in the processing module 320) may determine a planning route based on the service request and the first feedback information. In some embodiments, if the first feedback information of the passenger terminal 130 refuses to enter high-speed toll road sections, no other inquiry information inquiring whether to enter high-speed toll road sections may be transmitted during the trip. In some embodiments, if the first feedback information of the passenger terminal 130 agrees to enter high-speed toll road sections, other inquiry information inquiring associated with entering the high-speed toll road sections may be transmitted again during the trip.

Figure 21:
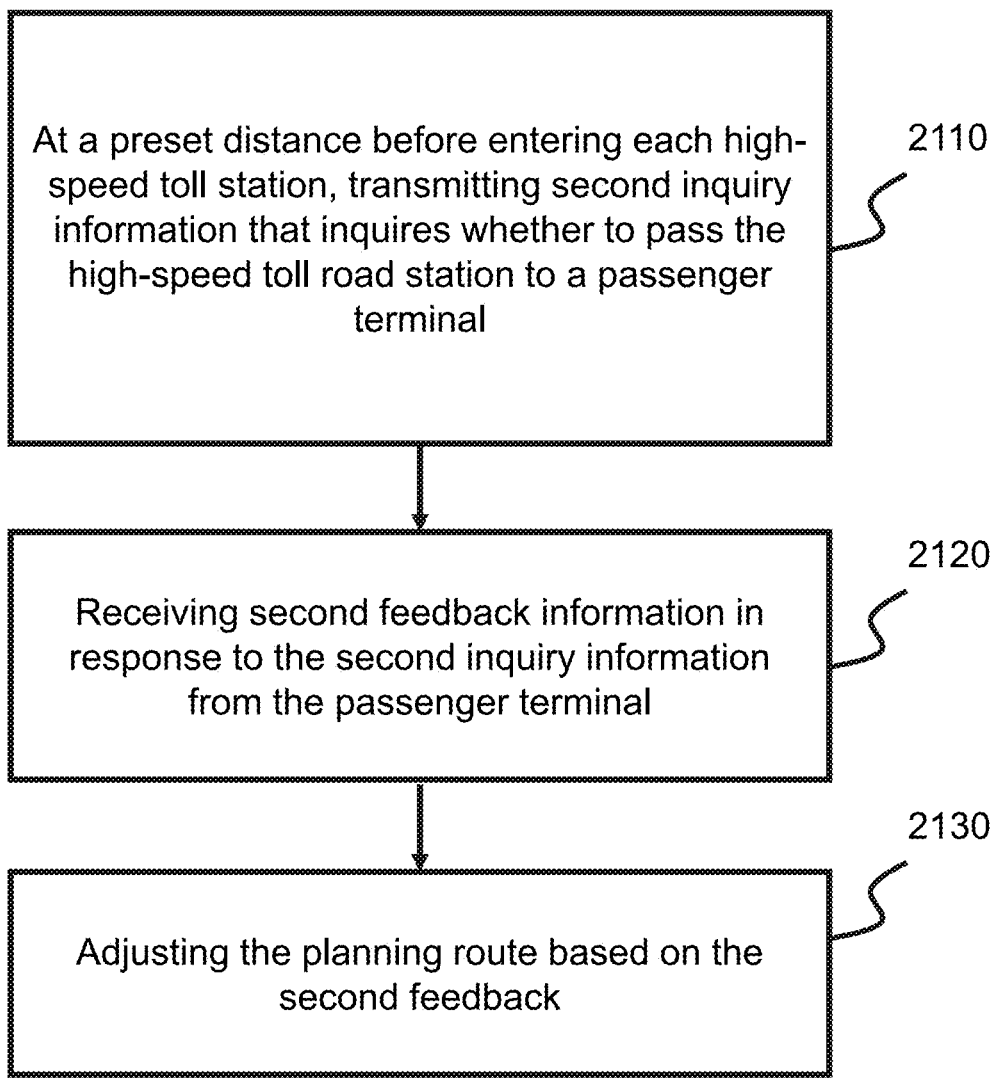
FIG. 21 is a flowchart of an exemplary process for determining a planning route adjustment according to some embodiments of the present disclosure.

Referring back to FIG. 20, step 2020 may be implemented by the method 2100 for determining a planning route adjustment as shown in FIG. 21. As shown in FIG. 21, in step 2110, the server 110 (e.g., the feedback module 330 of the server 110, or the second information transmitting unit 650 in the feedback module 330) may transmit second inquiry information inquiring whether to enter a high-speed toll station to the passenger terminal 130 at a preset distance before the high-speed toll station. In step 2120, the server 110 (e.g., the feedback module 330 of the server 110, or the information receiving unit 660 in the feedback module 330) may receive second feedback information of the passenger terminal 130 in response to the second inquiry information.

In step 2130, the server 110 (e.g., the processing module 320 of the server 110, or the route planning determination unit 540 in the processing module 320) may determine a planning route adjustment based on the second feedback information obtained from the second inquiry information. In some embodiments, if the second feedback information of the passenger terminal 130 refuses to enter a certain high-speed toll road section, the server 110 (e.g., the processing module 320 of the server 110, or the route planning determination unit 540 in the processing module 320) may bypass the toll road section and re-plan the route.

In some embodiments, the method 2100 may be independent from the method 2000, that is, the first inquiry information may not be transmitted to the passenger terminal 130 at the beginning of a trip, but only the second inquiry information is transmitted before entering each high-speed toll station.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device" or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

For each of the patents, patent applications, patent application publications and other materials, such as articles, books, instructions, publications, documents, articles, etc., cited in this application are hereby incorporated by reference in their entirety. In addition to the application history documents that are inconsistent or conflicting with the contents of the present application, the documents that may limit the widest range of the claim of the present application (currently or later attached to this application) is excluded from the application. It is to be noted that if the description, definition, and/or terminology used in the appended application of the present application is inconsistent or conflicting with the contents described in this application, the description, definition and/or terminology may be subject to the present application.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for determining and displaying transportation service fee of an on-demand transportation service, comprising:
    at least one non-transitory computer-readable storage medium including a set of instructions for determining a transport service fee and at least one pre-trained linear regression model; and
    at least one processor in communication with the at least one non-transitory computer-readable storage medium, wherein when executing the set of instructions, the at least one processor is directed to:
        obtain first electronic signals encoding a service request from a passenger terminal device, wherein the service request comprises starting point information and destination information;
        operate logical circuits in the at least one processor to determine an estimated transport service fee based on the service request;
        operate the logical circuits in the at least one processor to access the at least one non-transitory computer-readable storage medium to obtain the at least one pre-trained linear regression model;
        operate the logical circuits in the at least one processor to obtain a price adjustment condition based on the service request and the at least one pre-trained linear regression model, wherein the price adjustment condition is related to the starting point or historical information of the passenger terminal device or a driver terminal device and includes a first acceptance probability before a price adjustment of the passenger terminal device, a second acceptance probability after the price adjustment of the passenger terminal device, a first order snatching probability before the price adjustment of the driver terminal device, and a second order snatching probability after the price adjustment of the driver terminal device;
        operate the logical circuits in the at least one processor to determine an amount of price adjustment based on the price adjustment condition;
        operate the logical circuits in the at least one processor to determine an estimated transport service fee after price adjustment based on the amount of price adjustment and the estimated transport service fee; and
        transmit second electronic signals encoding the estimated transport service fee after price adjustment to the passenger terminal device for display on the passenger terminal device.

2. The system of claim 1, the at least one processor is further directed to:
    operate the logical circuits in the at least one processor to determine a real-time transport service fee based on the service request; and
    transmit third electronic signals encoding the real-time transport service fee to the passenger terminal device.

3. The system of claim 2, wherein to determine the real-time transport service fee, the at least one processor is directed to:
    operate the logical circuits in the at least one processor to obtain a driven route based on the service request;
    operate the logical circuits in the at least one processor to identify a high-speed toll road section of the driven route based on the driven route;
    operate the logical circuits in the at least one processor to determine a high-speed toll amount based on the high-speed toll road section; and
    operate the logical circuits in the at least one processor to determine the real-time transport service fee at least in part based on the high-speed toll amount.

4. The system of claim 3, before identifying the high-speed toll road section of the driven route further, the at least one processor is further directed to:
    transmit fourth electronic signals encoding a first inquiry which inquires whether to pass the high-speed toll road section to the passenger terminal device at the beginning of a trip;
    receive fifth electronic signals encoding a first feedback corresponding to the first inquiry from the passenger terminal device; and
    operate the logical circuits in the at least one processor to determine a planning route based on the service request and the first feedback.

5. The system of claim 3, wherein to identify the high-speed toll road section of the driven route, the processor is directed to:
    operate the logical circuits in the at least one processor to obtain a location coordinate point along the driven route based on the driven route;
    operate the logical circuits in the at least one processor to determine a high-speed toll station along the driven route based on the location coordinate point and a map;
    operate the logical circuits in the at least one processor to identify the high-speed toll road section of the driven route based on the high-speed toll station.

6. The system of claim 2, wherein to determine the real-time transport service fee, the at least one processor is directed to:
    operate the logical circuits in the at least one processor to receive at least one data packet including a location data point;
    operate the logical circuits in the at least one processor to identify a valid data packet including the location data point from the at least one data packet; and operate the logical circuits in the at least one processor to determine the real-time transport service fee based on a preset fee rule and the location data point in the valid data packet.

7. The system of claim 1, wherein to determine the estimated transport service fee, the at least one processor is directed to:
   operate the logical circuits in the at least one processor to determine a first distance based on the service request;
   operate the logical circuits in the at least one processor to obtain an estimating equation, wherein the estimating equation is a functional relationship of a distance and the estimated transport service fee; and
   operate the logical circuits in the at least one processor to determine the estimated transport service fee based on the first distance and the estimating equation.

8. The system of claim 7, wherein to obtain the estimating equation, the at least one processor is directed to:
   operate the logical circuits in the at least one processor to obtain historical data belonging to a same city and a same time period of the service request, wherein the historical data includes a second distance and a corresponding transport service fee; and
   operate the logical circuits in the at least one processor to generate the estimating equation based on the historical data and a preset model.

9. The system of claim 1, wherein to obtain the price adjustment condition, the at least one processor is directed to:
   operate the logical circuits in the at least one processor to identify at least one driver terminal device within a nearby region of the starting point based on the starting point information of the service request;
   operate the logical circuits in the at least one processor to obtain a preset amount of price adjustment;
   operate the logical circuits in the at least one processor to obtain the first acceptance probability and the second acceptance probability based on the amount of the preset price adjustment; and
   operate the logical circuits in the at least one processor to obtain the first order snatching probability and the second order snatching probability based on the amount of the preset price adjustment.

10. The system of claim 1, wherein to determine the amount of price adjustment, the at least one processor is directed to:
    operate the logical circuits in the at least one processor to determine a ratio between a number of the driver terminal devices and a number of the service requests;
    operate the logical circuits in the at least one processor to obtain a preset amount of price adjustment; and
    operate the logical circuits in the at least one processor to determine an amount of price adjustment based on the preset amount of price adjustment and the ratio.

11. A method for determining and displaying transportation service fee of an on-demand transportation service, implemented on at least one device including at least one processor and at least one non-transitory computer-readable storage medium, the method comprising:
    obtaining first electronic signals encoding a service request from a passenger terminal device, wherein the service request includes starting point information and destination information;
    operating logical circuits in the at least one processor to determine an estimated transport service fee based on the service request;
    operating the logical circuits in the at least one processor to access the at least one non-transitory computer-readable storage medium to obtain at least one pre-trained linear regression model;
    operating the logical circuits in the at least one processor to obtain a price adjustment condition based on the service request and the at least one pre-trained linear regression model, wherein the price adjustment condition is related to the starting point or historical information of the passenger terminal device or a driver terminal device and includes a first acceptance probability before a price adjustment of the passenger terminal device, a second acceptance probability after the price adjustment of the passenger terminal device, a first order snatching probability before the price adjustment of the driver terminal device, and a second order snatching probability after the price adjustment of the driver terminal device;
    operating the logical circuits in the at least one processor to determine an amount of price adjustment based on the price adjustment condition;
    operating the logical circuits in the at least one processor to determine an estimated transport service fee after price adjustment based on the amount of price adjustment and the estimated transport service fee; and
    transmitting second electronic signals encoding the estimated transport service fee after price adjustment to the passenger terminal device for display on the passenger terminal device.

12. The method of claim 11, further comprising:
    operating the logical circuits in the at least one processor to determine a real-time transport service fee based on the service request; and
    transmitting third electronic signals encoding the real-time transport service fee to the passenger terminal device.

13. The method of claim 12, wherein the operating the logical circuits in the at least one processor to determine the real-time transport service fee comprises:
    operating the logical circuits in the at least one processor to obtain a driven route based on the service request;
    operating the logical circuits in the at least one processor to identify a high-speed toll road section of the driven route based on the driven route;
    operating the logical circuits in the at least one processor to determine a high-speed toll amount based on the high-speed toll road section; and
    operating the logical circuits in the at least one processor to determine the real-time transport service fee at least in part based on the high-speed toll amount.

14. The method of claim 13, wherein the operating the logical circuits in the at least one processor to determine the high-speed toll road section among the driven route comprises:
    operating the logical circuits in the at least one processor to obtain a location coordinate point along the driven route based on the driven route;
    operating the logical circuits in the at least one processor to determine a high-speed toll station along the driven route based on the location coordinate point and a map; and
    operating the logical circuits in the at least one processor to identify the high-speed toll road section of the driven route based on the high-speed toll station.

15. The method of claim 12, wherein the operating the logical circuits in the at least one processor to determine the real-time transport service fee comprises:

operating the logical circuits in the at least one processor to receive at least one data packet including a location data point;

operating the logical circuits in the at least one processor to identify a valid data packet including the location data point from the at least one data packet; and operating the logical circuits in the at least one processor to determine the real-time transport service fee based on a preset fee rule and the location data point in the valid data packet.

16. The method of claim 11, wherein the operating logical circuits in the at least one processor to determine the estimated transport service fee comprises:

operating the logical circuits in the at least one processor to determine a first distance based on the service request;

operating the logical circuits in the at least one processor to obtain an estimating equation, wherein the estimating equation is a functional relationship of a distance and the estimated transport service fee; and operating the logical circuits in the at least one processor to determine the estimated transport service fee based on the first distance and the estimating equation.

17. The method of claim 16, wherein the operating the logical circuits in the at least one processor to obtain the estimating equation comprises:

operating the logical circuits in the at least one processor to obtain historical data belonging to a same city and a same time period of the service request, wherein the historical data includes a second distance and a corresponding transport service fee; and operating the logical circuits in the at least one processor to generate the estimating equation based on the historical data and a preset model.

18. The method of claim 11, wherein the operating the logical circuits in the at least one processor to obtain the price adjustment condition comprises:

operating the logical circuits in the at least one processor to identify at least one driver terminal device within a nearby region of the starting point based on the starting point information of the service request;

operating the logical circuits in the at least one processor to obtain a preset amount of the price adjustment;

operating the logical circuits in the at least one processor to obtain the first acceptance probability and the second acceptance probability based on the amount of the preset price adjustment; and operating the logical circuits in the at least one processor to obtain the first order snatching probability and the second order snatching probability based on the amount of the preset price adjustment.

19. The method of claim 11, wherein the operating the logical circuits in the at least one processor to determine the amount of the price adjustment comprises:

operating the logical circuits in the at least one processor to determine a ratio between a number of the driver terminal devices and a number of the service requests;

operating the logical circuits in the at least one processor to obtain a preset amount of price adjustment; and operating the logical circuits in the at least one processor to determine an amount of price adjustment based on the preset amount of price adjustment and the ratio.

20. A non-transitory computer-readable medium, comprising executable instructions for determining and displaying transportation service fee of an on-demand transportation service, when executed by an electronic device, that includes at least one processor, directs the at least one processor to perform actions of:

obtaining first electronic signals encoding a service request from a passenger terminal device, wherein the service request comprises starting point information and destination information;

operating logical circuits in the at least one processor to determine an estimated transport service fee based on the service request;

operating the logical circuits in the at least one processor to access the at least one non-transitory computer-readable storage medium to obtain at least one pre-trained linear regression model;

operating the logical circuits in the at least one processor to obtain a price adjustment condition based on the service request and the at least one pre-trained linear regression model, wherein the price adjustment condition is related to the starting point or historical information of the passenger terminal device or a driver terminal device and includes a first acceptance probability before a price adjustment of the passenger terminal device, a second acceptance probability after the price adjustment of the passenger terminal device, a first order snatching probability before the price adjustment of the driver terminal device, and a second order snatching probability after the price adjustment of the driver terminal device;

operating the logical circuits in the at least one processor to determine an amount of the price adjustment based on the price adjustment condition;

operating the logical circuits in the at least one processor to determine an estimated transport service fee after price adjustment based on the amount of the price adjustment and the estimated transport service fee; and transmitting second electronic signals encoding the estimated transport service fee after price adjustment to the passenger terminal device for display on the passenger terminal device.

\* \* \* \* \*